United States Patent
Zhu et al.

(10) Patent No.: US 11,816,857 B2
(45) Date of Patent: Nov. 14, 2023

(54) METHODS AND APPARATUS FOR GENERATING POINT CLOUD HISTOGRAMS

(71) Applicant: Cognex Corporation, Natick, MA (US)

(72) Inventors: Hongwei Zhu, Natick, MA (US); David J. Michael, Waban, MA (US); Nitin M. Vaidya, Shrewsbury, MA (US)

(73) Assignee: Cognex Corporation, Natick, MA (US)

( * ) Notice: Subject to any disclaimer, the term of this patent is extended or adjusted under 35 U.S.C. 154(b) by 50 days.

(21) Appl. No.: 17/316,327

(22) Filed: May 10, 2021

(65) Prior Publication Data

US 2021/0350165 A1 Nov. 11, 2021

Related U.S. Application Data

(60) Provisional application No. 63/065,456, filed on Aug. 13, 2020, provisional application No. 63/023,163, filed on May 11, 2020.

(51) Int. Cl.
  *G06T 15/00* (2011.01)
  *G06T 7/66* (2017.01)
  (Continued)

(52) U.S. Cl.
  CPC ............. *G06T 7/66* (2017.01); *G06F 18/22* (2023.01); *G06T 7/50* (2017.01); *G06T 11/206* (2013.01);
  (Continued)

(58) Field of Classification Search
  CPC .. G06V 10/507; G06V 10/758; G06K 9/4642; G06K 9/6215; G06T 2207/10028;
  (Continued)

(56) References Cited

U.S. PATENT DOCUMENTS 7,317,456 B1 1/2008 Lee
10,115,035 B2 10/2018 Lee et al.
(Continued)

OTHER PUBLICATIONS

Fiolka T, Stückler J, Klein DA, Schulz D, Behnke S. Distinctive 3D surface entropy features for place recognition. In2013 European Conference on Mobile Robots Sep. 25, 2013 (pp. 204-209). IEEE. (Year: 2013).*

(Continued)

*Primary Examiner* — Phu K Nguyen
(74) *Attorney, Agent, or Firm* — Wolf, Greenfield & Sacks, P.C.

(57) ABSTRACT

The techniques described herein relate to methods, apparatus, and computer readable media configured to generate point cloud histograms. A one-dimensional histogram can be generated by determining a distance to a reference for each 3D point of a 3D point cloud. A one-dimensional histogram is generated by adding, for each histogram entry, distances that are within the entry's range of distances. A two-dimensional histogram can be determined by generating a set of orientations by determining, for each 3D point, an orientation with at least a first value for a first component and a second value for a second component. A two-dimensional histogram can be generated based on the set of orientations. Each bin can be associated with ranges of values for the first and second components. Orientations can be added for each bin that have first and second values within the first and second ranges of values, respectively, of the bin.

20 Claims, 16 Drawing Sheets

(51) Int. Cl.
G06T 11/20 (2006.01)
G06T 17/20 (2006.01)
G06T 7/50 (2017.01)
G06F 18/22 (2023.01)
G06V 10/50 (2022.01)

(52) U.S. Cl.
CPC .............. *G06T 17/20* (2013.01); *G06V 10/50* (2022.01); *G06T 2207/10028* (2013.01); *G06T 2207/20072* (2013.01)

(58) Field of Classification Search
CPC ......... G06T 7/66; G06T 17/20; G06T 11/206; G06T 7/50; G06T 2207/20072
USPC .......................................................... 345/418
See application file for complete search history.

(56) References Cited

U.S. PATENT DOCUMENTS

| | | | |
|---|---|---|---|
| 11,403,817 B1* | 8/2022 | Eckman | G01C 15/00 |
| 11,468,609 B2 | 10/2022 | Zhu et al. | |
| 2003/0202692 A1 | 10/2003 | Obrador | |
| 2008/0137949 A1 | 6/2008 | Zouhar et al. | |
| 2010/0100362 A1 | 4/2010 | Zouhar et al. | |
| 2010/0315412 A1 | 12/2010 | Sinha et al. | |
| 2011/0129149 A1 | 6/2011 | Kang | |
| 2013/0321392 A1 | 12/2013 | van der Merwe et al. | |
| 2016/0203384 A1 | 7/2016 | Richmond et al. | |
| 2016/0224858 A1 | 8/2016 | Chen | |
| 2019/0258225 A1 | 8/2019 | Link et al. | |
| 2020/0040555 A1* | 2/2020 | Hageman | G01C 9/06 |
| 2020/0132822 A1 | 4/2020 | Pimentel et al. | |
| 2020/0386862 A1 | 12/2020 | Cop et al. | |
| 2021/0174579 A1 | 6/2021 | Wakimoto | |
| 2021/0350595 A1 | 11/2021 | Zhu et al. | |

OTHER PUBLICATIONS

Unnikrishnan R, Hebert M. Multi-scale interest regions from unorganized point clouds. In2008 IEEE Computer Society Conference on Computer Vision and Pattern Recognition Workshops Jun. 23, 2008 (pp. 1-8). IEEE. (Year: 2008).*
Rusu RB, Marton ZC, Blodow N, Dolha M, Beetz M. Towards 3D point cloud based object maps for household environments. Robotics and Autonomous Systems. Nov. 30, 2008;56(11):927-41.*
Douillard B, Underwood J, Kuntz N, Vlaskine V, Quadros A, Morton P, Frenkel A. On the segmentation of 3D LIDAR point clouds. In2011 IEEE International Conference on Robotics and Automation May 9, 2011 (pp. 2798-2805). IEEE.*
Vosselman G, Gorte BG, Sithole G, Rabbani T. Recognising structure in laser scanner point clouds. International archives of photogrammetry, remote sensing and spatial information sciences. Oct. 2, 2004;46(8):33-8.*
Vo AV, Truong-Hong L, Laefer DF, Bertolotto M. Octree-based region growing for point cloud segmentation. ISPRS Journal of Photogrammetry and Remote Sensing. Jun. 1, 2015;104:88-100.*
Pasinetti S, Nuzzi C, Lancini M, Sansoni G, Docchio F, Fornaser A. Development and characterization of a safety system for robotic cells based on multiple Time of Flight (TOF) cameras and point cloud analysis. In2018 Workshop on Metrology for Industry 4.0 and IoT Apr. 16, 2018 (pp. 1-6). IEEE.*
Fouts A, Rizki M, Tamburino L, Mendoza-Schrock O. Evolving robust gender classification features for CAESAR data. InProceedings of the 2011 IEEE National Aerospace and Electronics Conference (NAECON) Jul. 20, 2011 (pp. 280-285). IEEE.*
Blomley R, Weinmann M, Leitloff J, Jutzi B. Shape distribution features for point cloud analysis—a geometric histogram approach on multiple scales. ISPRS Annals of the Photogrammetry, Remote Sensing and Spatial Information Sciences. 2014 IEEE Transactions on Geoscience and Remote Sensing. Oct. 2, 2015;54(2):1226-39.*
Lehtola VV, Virtanen JP, Rönnholm P, Nüchter A. Localization corrections for mobile laser scanner using local support-based outlier filtering. ISPRS Annals of the Photogrammetry, Remote Sensing and Spatial Information Sciences. 2016;3:81.*
Wang F, Liang C, Ru C, Cheng H. An improved point cloud descriptor for vision based robotic grasping system. Sensors. May 14, 2019;19(10):2225.*
Rusu RB, Bradski G, Thibaux R, Hsu J. Fast 3d recognition and pose using the viewpoint feature histogram. In2010 IEEE/RSJ International Conference on Intelligent Robots and Systems Oct. 18, 2010 (pp. 2155-2162). IEEE.*
Rusu RB, Blodow N, Marton Z, Soos A, Beetz M. Towards 3D object maps for autonomous household robots. In2007 IEEE/RSJ international conference on intelligent robots and systems Oct. 29, 2007 (pp. 3191-3198). IEEE.*
Fiolka et al., Distinctive 3D surface entropy features for place recognition. 2013 European Conference on Mobile Robots (ECMR), IEEE, Sep. 25-27, 2013. pp. 204-209.
U.S. Appl. No. 17/316,372, filed May 10, 2021, Zhu et al.
International Search Report and Written Opinion dated Aug. 23, 2021 in connection with International Application No. PCT/US2021/031519.
Rusu et al., Persistent point feature histograms for 3D point clouds. Proc 10th Int Conf Intel Autonomous Syst (IAS-10), Baden-Baden, Germany. Jul. 2008:119-128. 10 pages.
Wahl et al., Surflet-pair-relation histograms: a statistical 3D-shape representation for rapid classification. IEEE, Proceedings of the Fourth International Conference on 3-D Digital Imaging and Modeling (3DIM 2003). Oct. 6, 2003:474-481. 8 pages.
International Preliminary Report on Patentability dated Nov. 24, 2022 for International Application No. PCT/US2021/031519.
PCT/US2021/031519, dated Nov. 24, 2022, International Preliminary Report on Patentability.

* cited by examiner

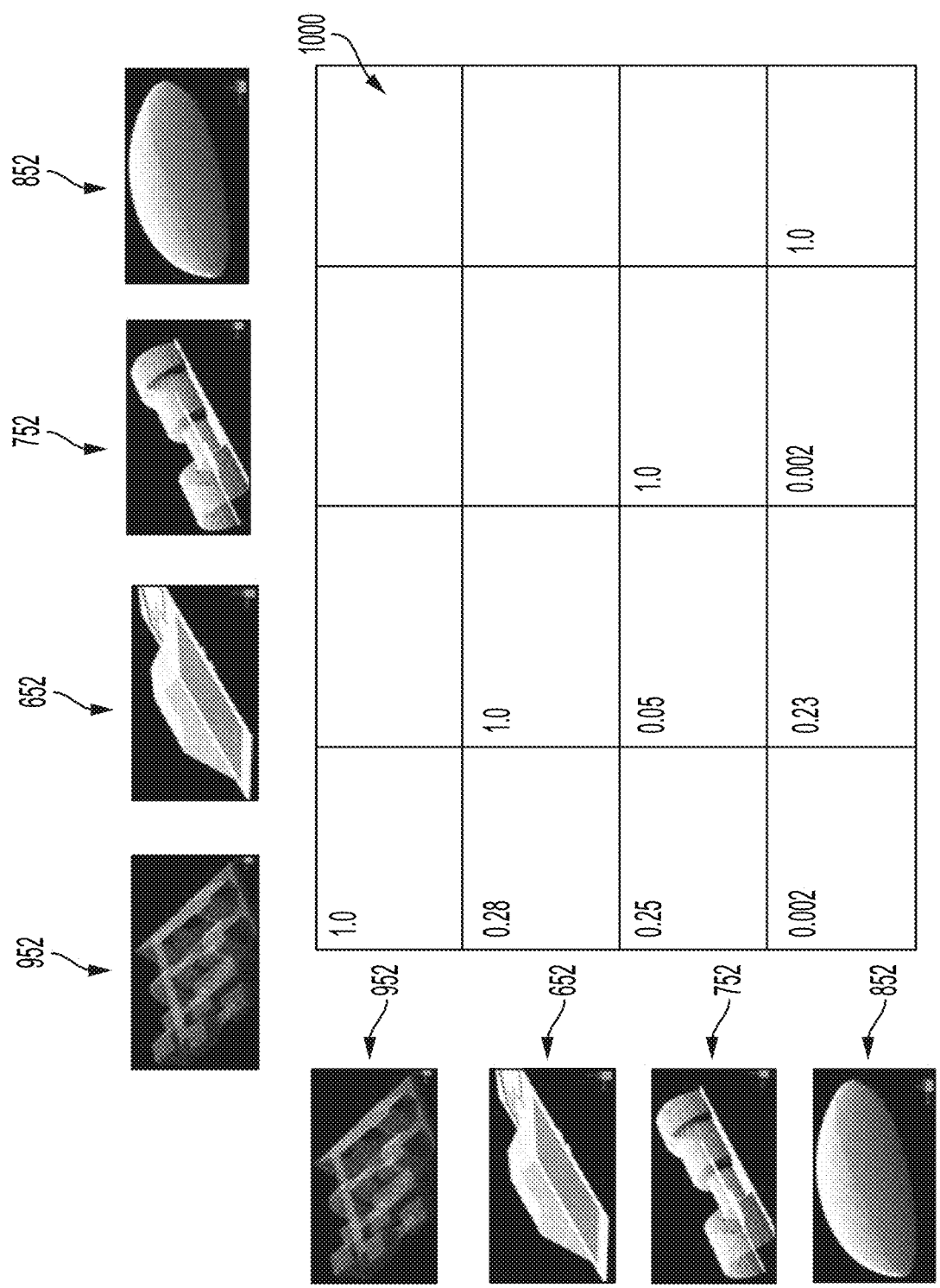

METHODS AND APPARATUS FOR GENERATING POINT CLOUD HISTOGRAMS

RELATED APPLICATIONS

This Application claims priority under 35 U.S.C. § 119(e) to U.S. Provisional Application Ser. No. 63/023,163, titled "METHODS AND APPARATUS FOR GENERATING POINT CLOUD HISTOGRAMS," filed on May 11, 2020, and U.S. Provisional Application Ser. No. 63/065,456, titled "METHODS AND APPARATUS FOR GENERATING POINT CLOUD HISTOGRAMS," filed on Aug. 13, 2020, which are herein incorporated by reference in their entirety.

TECHNICAL FIELD

The techniques described herein relate generally to methods and apparatus for machine vision, including techniques for generating histograms of point cloud data.

BACKGROUND OF INVENTION

Machine vision systems can include robust imaging capabilities, including three-dimensional (3D) imaging devices. For example, 3D sensors can image a scene to generate a set of 3D points that each include an (x, y, z) location within a 3D coordinate system (e.g., where the z axis of the coordinate system represents a distance from the 3D imaging device). Such 3D imaging devices can generate a 3D point cloud, which includes a set of 3D points captured during a 3D imaging process. However, the sheer number of 3D point in 3D point clouds can be massive (e.g., compared to 2D data of a scene). Additionally, 3D point clouds may only include pure 3D data points, and therefore may not include data indicative of relations between/among the 3D points, or other information, such as surface normal information, it can be complicated to process 3D points with no data indicative of relations among other points. Therefore, while 3D point clouds can provide a large amount of 3D data, performing machine vision tasks on 3D point cloud data can be complicated, time consuming, require significant processing resources, and/or the like.

SUMMARY OF INVENTION

In accordance with the disclosed subject matter, apparatus, systems, and methods are provided for improved machine vision techniques, and in particular for improved machine vision techniques that provide for summarizing point cloud data (e.g., which can be used to compare objects in point cloud data). In some embodiments, the techniques provide for generating histograms of point cloud data. The histograms can be of various dimensions, such as one-dimensional and/or two-dimensional histograms. The histograms can be generated using various metrics, including based on a reference to the point cloud data. For example, one-dimensional histograms can be generated based on distances of 3D points to a reference plane, to a representative point of the 3D point cloud (e.g., a center of mass), and/or the like. As another example, two-dimensional histograms can be generated based on information determined from the 3D point cloud, such as based on surface normals, vectors, and/or the like.

Some aspects relate to a computerized method for generating a histogram of a three-dimensional (3D) point cloud. The method includes receiving data indicative of a 3D point cloud comprising a plurality of 3D points, determining a reference in spatial relation to the 3D point cloud, determining, for each 3D point of the plurality of 3D points, a distance to the reference to generate a set of distances for the plurality of 3D points, and generating, based on the set of distances, a histogram comprising a set of entries, comprising inserting, for each entry of the set of entries, distances from the set of distances that are within a range of distances associated with the entry.

According to some examples, the method includes generating a 3D voxel grid for at least a portion of the 3D point cloud, wherein each voxel of the 3D voxel grid comprises a same set of dimensions, determining, for each voxel of the 3D voxel grid, whether one or more of the plurality of 3D data points is within the voxel to generate an associated set of 3D points for the voxel, determining, for each voxel of the 3D voxel grid with an associated set of 3D points, a single 3D data point for the voxel based on the associated set of 3D data points, and storing the single 3D data point in the voxel. Determining the set of distances can include determining, for each voxel of the 3D voxel grid, a distance from the single 3D data point to the reference to generate the set of distances.

According to some examples, the reference is a two-dimensional (2D) reference plane, and determining the distance of each 3D point to generate the set of distances comprises determining a shortest distance of each 3D point to the reference plane.

According to some examples, the reference is a reference line, and determining the distance of each 3D point to generate the set of distances comprises determining a shortest distance of each 3D point to the reference line.

According to some examples, the method includes determining an estimated center of mass of the 3D point cloud, wherein the reference is the estimated center of mass. Determining the distance of each 3D point to generate the set of distances can include determining a distance of each 3D point to the estimated center of mass.

According to some examples, the method includes comparing the histogram with a second histogram generated for a second 3D point cloud to determine a measure of similarity between the 3D point cloud and the second 3D point cloud.

Some aspects relate to a computerized method for generating a histogram of a three-dimensional (3D) point cloud. The method includes receiving data indicative of a 3D point cloud comprising a plurality of 3D points. The method includes generating a set of orientations, comprising determining, for each 3D point in the 3D point cloud, an orientation of the 3D point, wherein the orientation comprises at least a first value for a first component and a second value for a second component. The method includes generating, based on the set of orientations, a histogram comprising a set of bins, wherein each bin of the set of bins is associated with a first range of values of the first component and a second range of values of the second component, and generating the histogram comprises adding, for each bin of the set of bins, orientations from the set of orientations with first and second values that are within the first and second ranges of values, respectively, associated with the bin.

According to some examples, the set of bins are arranged in two dimensions, wherein the first dimension is associated with the first component and the second dimension is associated with the second component.

According to some examples, the first component comprises a tilt angle and the second component comprises an azimuth angle.

According to some examples, the method further includes generating a 3D voxel grid for at least a portion of the 3D point cloud, wherein each voxel of the 3D voxel grid comprises a same set of dimensions, determining, for each voxel of the 3D voxel grid, whether one or more of the plurality of 3D data points is within the voxel to generate an associated set of 3D points for the voxel, determining, for each voxel of the 3D voxel grid with an associated set of 3D points, a single 3D data point for the voxel based on the associated set of 3D data points, and storing the single 3D data point in the voxel. Generating the set of orientations includes determining, for each voxel of the 3D voxel grid, an orientation of the single 3D data point to generate the set of orientations.

According to some examples, generating the set of orientations comprises determining, for each 3D point in the 3D point cloud, the orientation of the 3D point based on a fixed coordinate system associated with the 3D point cloud.

According to some examples, generating the set of orientations comprises determining, for each 3D point in the 3D point cloud, the orientation of the 3D point based on a local coordinate system associated with a 3D point of the 3D point cloud.

According to some examples, the method includes comparing the histogram with a second histogram associated with a second 3D point cloud to determine data indicative of a measure of similarity between the 3D point cloud and the second 3D point cloud. Comparing the histogram with the second histogram includes determining a first set of peaks of the histogram and a second set of peaks of the second histogram, and determining a correspondence between at least a portion of the first set of peaks to at least a portion of the second set of peaks.

Some embodiments relate to a non-transitory computer-readable media comprising instructions that, when executed by one or more processors on a computing device, are operable to cause the one or more processors to execute the method of any of the techniques described herein.

Some embodiments relate to a system comprising a memory storing instructions, and a processor configured to execute the instructions to perform the method of any of the techniques described herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 10 is a table showing exemplary similarity scores computed using the 2D direction histograms described in conjunction with FIGS. 6-9, according to some embodiments.

DETAILED DESCRIPTION OF INVENTION

Figure 1:
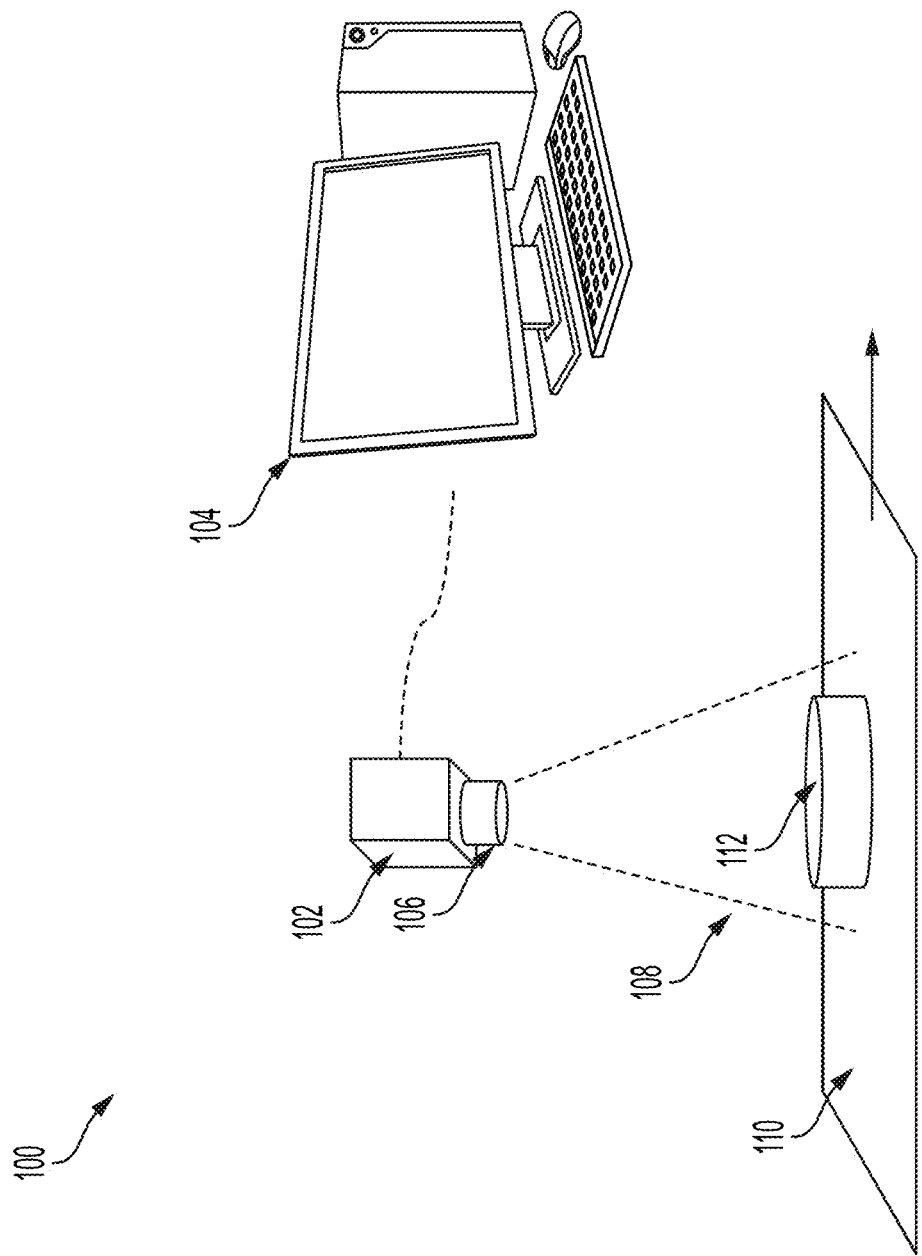
FIG. 1 shows an exemplary machine vision system, according to some embodiments.

The techniques described herein provide for data reduction techniques that can be used to analyze 3D point cloud images. The inventors have appreciated that conventional machine vision techniques may suffer from significant inefficiencies when processing 3D point cloud data (e.g., to determine whether an object is present in the 3D point cloud data). 3D point clouds often include hundreds of thousands or millions of (x, y, z) points. Therefore, the inventors have appreciated that directly interpreting such a massive number of 3D points in space can be quite challenging. For example, since 3D point clouds include such massive numbers of 3D points and typically do not include information about spatial relationships among 3D points, trying to interpret a pure 3D point cloud can be infeasible for many machine vision applications, which may have limited time to perform such interpretations, limited hardware resources, and/or the like.

In particular, it can be desirable to determine whether a 3D point cloud image captured an object. Conventional techniques approach such a problem by using computationally-intensive techniques to search a point cloud for the object. For example, some approaches process the set of 3D points to compute edge features that indicate abrupt changes (e.g., creases or tears in the surface(s) in the field of view), compute a measure of the prevalence of such edges, and determine the presence (or absence) of an object if the prevalence exceeds a predetermined threshold. Computing such edge features requires extensive calculations involving points in the neighborhood of each point in the 3D cloud. Additionally, or alternatively, it can be desirable to compare objects detected in different 3D point cloud images. Like object detection, such approaches can require computing edge features. For example, edge features can be computed in each of the point clouds, the locations and other attributes of the edges could be compared, and, finally, the comparisons could be aggregated into a measure of the similarity of the objects.

As another example, some approaches to object detection, classification and/or registration compute point meshes or surface patches to determine object features (e.g., surface curvature). Computing such meshes or surface patches can be time consuming alone, and techniques require performing further processing in order to determine object features and build a surface model. For example, computing surface features of a mesh or a patch and building a parametric model often requires iterative processing involving optimization, which therefore typically limits the use of the techniques to non-real-time applications.

The inventors have developed technological improvements to machine vision techniques to address these and other inefficiencies. The techniques described herein can reduce a 3D point cloud to a 1D signal (e.g., a 1D histogram) and/or 2D image (e.g., a 2D histogram) that can be used to easily interpret the 3D point cloud for various machine vision applications. The techniques also provide for interpreting the 1D and 2D signals, such as to compare different 3D point clouds to determine whether the 3D point clouds are similar. For example, 1D or 2D histograms can be computed for two different 3D point cloud images and compared to determine whether (or not) the 3D point cloud images likely include the same object. Since the traditionally massive amount of data in a 3D point cloud can be reduced to one or two dimensions, the techniques described herein can significantly improve performance, and allow various types of machine vision tasks to interpret 3D point clouds. Further, the resulting histograms can be represented using a small amount of data compared to conventional techniques, and therefore only require minimal use of memory or disk space to store the histograms.

The histogram-based techniques described can overcome the various processing inefficiencies of conventional techniques, as they do not require computationally-intensive aspects such as computing edge features, point meshes and/or surface patches (and further do not require generating surface models). Instead, the techniques described herein provide for determining statistical signatures of objects directly from the 3D points. For example, 1D histograms can be generated based on 3D point positions, and/or 2D histograms can be generated based on point normal vectors. As an illustrative example, consider a manufacturing application with a 3D sensor mounted above a conveyor belt on which objects pass (e.g., carboard boxes of different sizes, mailing envelopes, poly bags, and/or the like). Each category of object has different characteristics, including height(s) above the conveyor belt, surface normal orientations, etc. Such characteristics can be represented by 1D distance-based histograms and/or 2D direction-based histograms to detect and classify the objects in real-time as they travel down the conveyor belt. For example, given a distance histogram of a passing object, the height of the object above the conveyor belt can be quickly estimated using a statistical measure, e.g., mean, a specific percentile, mode, etc. Additionally, or alternatively, by using a histogram-derived measure, the techniques described herein can reduce noise, increase robustness of measurement results, and/or the like.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary machine vision system 100, according to some embodiments. The exemplary machine vision system 100 includes a camera 102 (or other imaging acquisition device) and a computer 104. While only one camera 102 is shown in FIG. 1, it should be appreciated that a plurality of cameras can be used in the machine vision system (e.g., where a point cloud is merged from that of multiple cameras). The computer 104 includes one or more processors and a human-machine interface in the form of a computer display and optionally one or more input devices (e.g., a keyboard, a mouse, a track ball, etc.). Camera 102 includes, among other components, a lens 106 and a camera sensor element (not illustrated). The lens 106 includes a field of view 108, and the lens 106 focuses light from the field of view 108 onto the sensor element. The sensor element generates a digital image of the camera field of view 108 and provides that image to a processor that forms part of computer 104. As shown in the example of FIG. 1, object 112 travels along a conveyor 110 into the field of view 108 of the camera 102. The camera 102 can generate one or more digital images of the object 112 while it is in the field of view 108 for processing, as discussed further herein. In operation, the conveyor can contain a plurality of objects. These objects can pass, in turn, within the field of view 108 of the camera 102, such as during an inspection process. As such, the camera 102 can acquire at least one image of each observed object 112.

In some embodiments, the camera 102 is a three-dimensional (3D) imaging device. As an example, the camera 102 can be a 3D sensor that scans a scene line-by-line, such as the DS-line of laser profiler 3D displacement sensors available from Cognex Corp., the assignee of the present application. According to some embodiments, the 3D imaging device can generate a set of (x, y, z) points (e.g., where the z axis adds a third dimension, such as a distance from the 3D imaging device). The 3D imaging device can use various 3D image generation techniques, such as shape-from-shading, stereo imaging, time of flight techniques, projector-based techniques, and/or other 3D generation technologies. In some embodiments the machine vision system 100 includes a two-dimensional imaging device, such as a two-dimensional (2D) CCD or CMOS imaging array. In some embodiments, two-dimensional imaging devices generate a 2D array of brightness values.

In some embodiments, the machine vision system processes the 3D data from the camera 102. The 3D data received from the camera 102 can include, for example, a point cloud and/or a range image. A point cloud can include a group of 3D points that are on or near the surface of a solid object. For example, the points may be presented in terms of their coordinates in a rectilinear or other coordinate system. In some embodiments, other information, such a mesh or grid structure indicating which points are neighbors on the object's surface, may optionally also be present. In some embodiments, information about surface features including curvatures, surface normal, edges, and/or color and albedo information, either derived from sensor measurements or computed previously, may be included in the input point clouds. In some embodiments, the 2D and/or 3D data may be obtained from a 2D and/or 3D sensor, from a CAD or other solid model, and/or by preprocessing range images, 2D images, and/or other images.

According to some embodiments, the group of 3D points can be a portion of a 3D point cloud within user specified regions of interest and/or include data specifying the region of interest in the 3D point cloud. For example, since a 3D point cloud can include so many points, it can be desirable to specify and/or define one or more regions of interest (e.g., to limit the space to which the techniques described herein are applied).

Examples of computer 104 can include, but are not limited to a single server computer, a series of server computers, a single personal computer, a series of personal computers, a mini computer, a mainframe computer, and/or a computing cloud. The various components of computer 104 can execute one or more operating systems, examples of which can include but are not limited to: Microsoft Windows Server™; Novell Netware™; Redhat Linux™, Unix, and/or a custom operating system, for example. The one or more processors of the computer 104 can be configured to process operations stored in memory connected to the one or more processors. The memory can include, but is not limited to, a hard disk drive; a flash drive, a tape drive; an optical drive; a RAID array; a random access memory (RAM); and a read-only memory (ROM).

The techniques described herein relate to generating histograms of 3D point clouds. The histograms can be generated based on geometrical aspects of the 3D point cloud, such as the positions of the 3D points, normal directions of the points (e.g., on a surface of an object captured by the 3D point cloud), and/or the like. Some embodiments relate to one-dimensional (1D) histograms. The 1D histograms can be generated with respect to a reference, such as a reference plane, line and/or other point that is spatially oriented relative to the point cloud. For example, a point-to-plane distance histogram is a 1D histogram generated based on the distances from each point (or other representation, such as a voxel) in the 3D point cloud to a selected or estimated plane. For example, a point-to-line distance histogram is a 1D histogram generated based on the distances from each point (or other representation, such as a voxel) in the 3D point cloud to a selected or estimated line. As another example, a point-to-center-of-mass distance histogram is a 1D histogram generated based on the distances from each point (or other representation, such as a voxel) in the 3D point cloud to the center of mass of the 3D point cloud. Some embodiments relate to two-dimensional (2D) histograms. For example, a normal direction projection histogram is a 2D histogram of the unit normal directions of the 3D point cloud.

The histograms can be used as useful feature descriptors of the scene for various 3D point cloud-based applications. The techniques described herein, including the descriptors and interpretation, can maintain geometric invariance against changes, such as changes in resolution, noise, and pose. Given the reduction in dimensionality and data points, the techniques can provide lower computational costs than conventional techniques used to compare point clouds. The histograms can be used (e.g., directly) as inputs for various image processing techniques and computer vision tools, including classification, measurement, object detection, object registration, deep learning, and/or the like.

Figure 2:
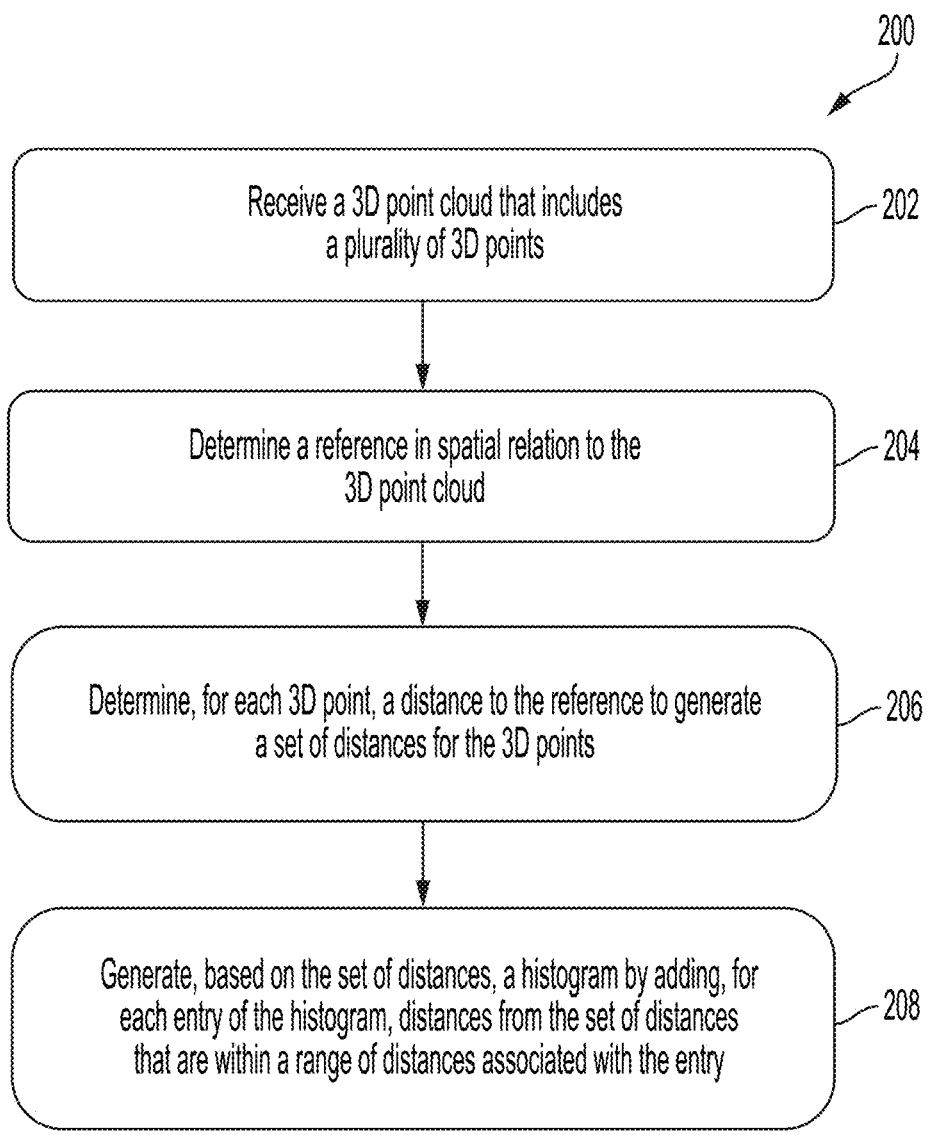
FIG. 2 is a flow chart showing an exemplary computerized method for generating a histogram of a three-dimensional point cloud, according to some embodiments.

Some embodiments of the techniques relate to generating 1D histograms. FIG. 2 is a flow chart showing an exemplary computerized method 200 for generating a histogram of a three-dimensional (3D) point cloud, according to some embodiments. At step 202, the machine vision system (e.g., the machine vision system 100 of FIG. 1) receives data indicative of a 3D point cloud that includes a plurality of 3D points. At step 204, the machine vision system determines a reference (e.g., a reference plane, a line, a centroid, and/or the like) that is disposed in some spatial relation to the 3D point cloud (e.g., selected based on the point cloud, computed based on the point cloud, and/or the like). At step 206, the machine vision system determines, for each 3D point of the plurality of 3D points, a distance to the reference to generate a set of distances for the plurality of 3D points. At step 208, the machine vision system generates, based on the set of distances, a histogram.

Referring to step 202, according to some embodiments the 3D point cloud can be processed before generating the histogram. For example, the techniques can include voxelizing the 3D point cloud. The machine vision system can generate a 3D voxel grid for at least a portion of the 3D point cloud (e.g., the portion of interest for which the histogram is to be computed), wherein each voxel of the 3D voxel grid has the same dimensions (e.g., the same length, width and height). The machine vision system can determine, for each voxel of the 3D voxel grid, whether the location of one or more of the plurality of 3D data points falls within the voxel to generate an associated set of 3D points for the voxel. It should be appreciated that some voxels may be empty (e.g., where the locations of the 3D points do not fall within those voxels).

According to some embodiments, the voxels can store its associated set of 3D points (e.g., for subsequent processing, such as for computing an average, median, and/or the like). According to some embodiments, the set of 3D points can be processed prior to storage in the voxels to reduce the number of data points stored in the voxel grid. For example, the machine vision system can determine, for each voxel of the 3D voxel grid, a single 3D data point for the voxel based on the associated set of 3D data points, and store the single 3D data point in the voxel (e.g., by determining a centroid of the points, averaging point values, etc.). The histogram can be generated based on the voxel data. For example, assume a set of 3D points are stored into voxels such that each voxel includes either zero 3D points (e.g., if no 3D points lie in the voxel) or one 3D point (e.g., if either a single 3D point falls in the voxel, or if multiple points are present, a representative 3D data point is generated for the multiple points). The machine vision system can determine the set of distances by determining, for each voxel of the 3D voxel grid that stores a 3D data point, a distance from the single 3D data point to the reference to generate the set of distances.

Referring to steps 204-208, according to some embodiments when a voxel grid is used to represent a 3D point cloud at step 202, the reference of step 204 can be determined in a spatial relation to the voxel grid. For step 206, a distance can be measured as that from the representative point of each voxel of the grid to the reference to generate a set of distances for producing the histogram at step 208.

Referring to step 204, various references can be used to compute the point cloud. According to some embodiments, the reference is a plane, such as a 2D reference plane. The reference plane can be determined according to various techniques. For example, a user can specify the 2D reference plane as an input. As another example, a user can specify a region of interest of the point cloud in which the contained points can be used to extract a plane as the reference plane. The reference plane can be extracted from the region of interest by using various techniques. For example, the reference plane can be extracted from the region of interest by using a least squares technique to fit a plane with some and/or all of the points contained within the region of interest, by using a RANSAC (RANdom SAmple Consensus) technique to fit the plane that has a maximum number of inliers over the contained points, and/or the like.

According to some embodiments, the reference can be a line estimated based on the 3D point cloud. The reference line can be determined based on the region of interest by using various techniques as described herein. For example, the reference line can be determined using a least squares technique to fit a line with some and/or all of the points contained within the region of interest. As another example, the reference line can be determined using a RANSAC technique to fit the line that has a maximum number of inliers over some and/or all of the points contained within the region of interest. In some embodiments, the reference line can be determined based on one or more 3D shapes extracted from the points in the region of interest (e.g., the axis of a cylinder, the intersection line of two non-parallel planes, etc.).

According to some embodiments, the reference can be a point estimated based on the 3D point cloud, such as an estimated center of mass or centroid of the 3D point cloud. The machine vision system can process the 3D point cloud (e.g., the 3D points and/or voxels) to determine the estimated center of mass, and use the estimated center of mass as the reference point. While computing the center of mass is an example of a technique that can be used to compute the reference point, it should be appreciated that other approaches can be used with the techniques described herein. In particular, the reference point used for creating the histogram can be determined as needed and it should not be limited to the centroid of the object under inspection. For example, the reference point can be created by determining a 3D shape and extracting the center of mass from that 3D shape, computing the center of mass from a subset of the 3D points, and/or the like.

Referring to step 206, if the reference is a plane, the machine vision system can determine the distance of each 3D point by determining a distance of each 3D point to the reference plane. The distance can be determined by computing, for example, a shortest distance of each point to the reference plane, a distance of each point along a projection, and/or the like. Such a 1D point-to-plane histogram can represent the distribution of point distances to the reference plane. Point-to-plane histograms can be useful for robustly measuring the distance/height from (e.g., noisy) 3D points to the reference plane by eliminating the effect from noisy and outlier points. In some embodiments, if the reference is a line, the machine vision system can determine the distance of each 3D point by determining a distance of each 3D point to the estimated line (e.g., a shortest distance to the estimated line). Such a 1D point-to-line histogram can represent a signature of an object's surface points.

Referring to step 208, in some embodiments the histogram includes a set of entries (e.g., one-dimensional bars, point plots, and/or the like). Each entry can be associated with, for example, a distance and/or a range of distances. According to some embodiments, when computing a histogram, the histogram entries can represent the signed or unsigned distances of each element of the 3D point cloud to the reference. Generating the histogram can include adding, for each entry of the histogram, the distances from the set of distances that meet and/or are within a range of distances associated with the entry. Adding can include, for example, determining a count of distances for each entry of the histogram, e.g., such that a distance is considered to belong to an entry of the histogram by discretizing/quantizing its value.

Referring to steps 206-208, in some embodiments, if the reference is a point (e.g., a center of mass), the machine vision system can determine the distance of each 3D point by determining a distance of each 3D point to the estimated center of mass. Such a 1D point-to-center-of-mass histogram can represent a signature of an object's surface points.

A point-to-center-of-mass histogram can be used as an effective feature for point-cloud-based object identification, classification, and/or the like.

Figure 3A:
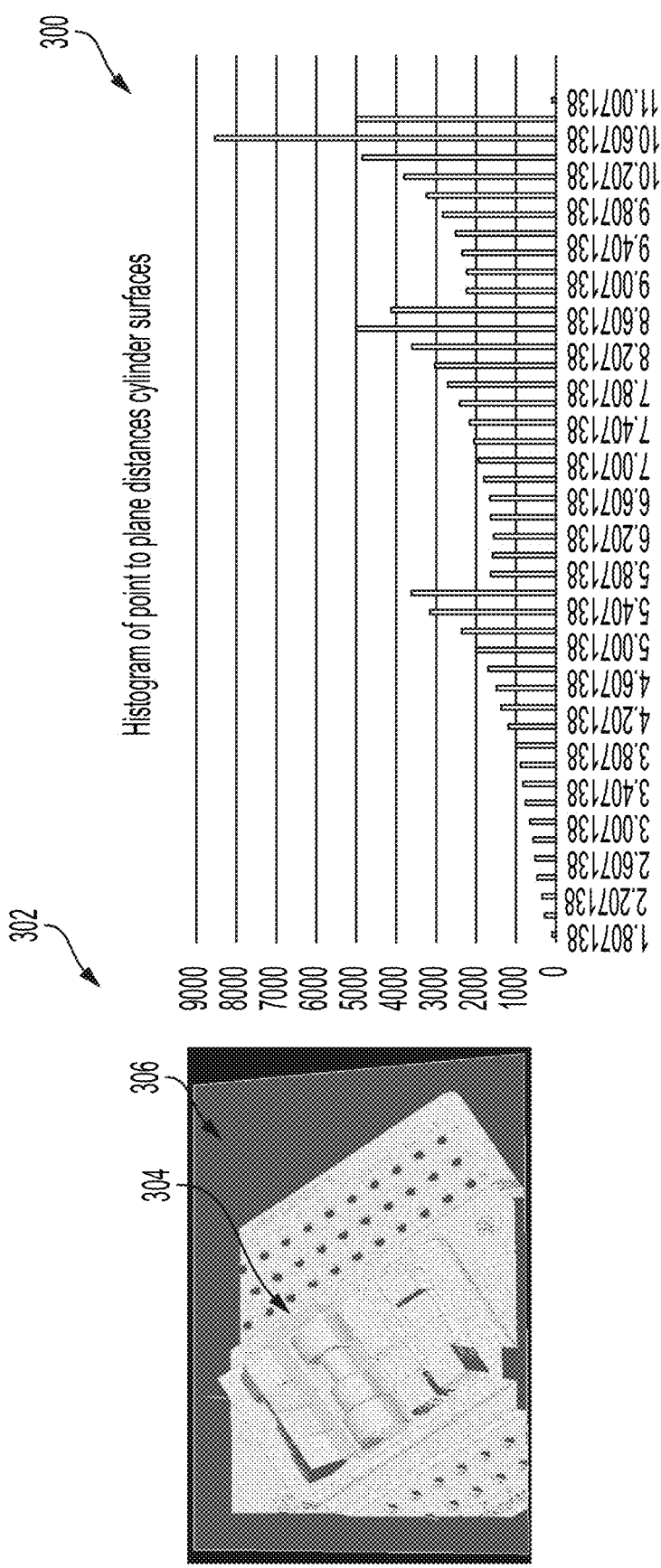
FIG. 3A shows two exemplary point-to-plane histograms, according to some embodiments.
Figure 3A:
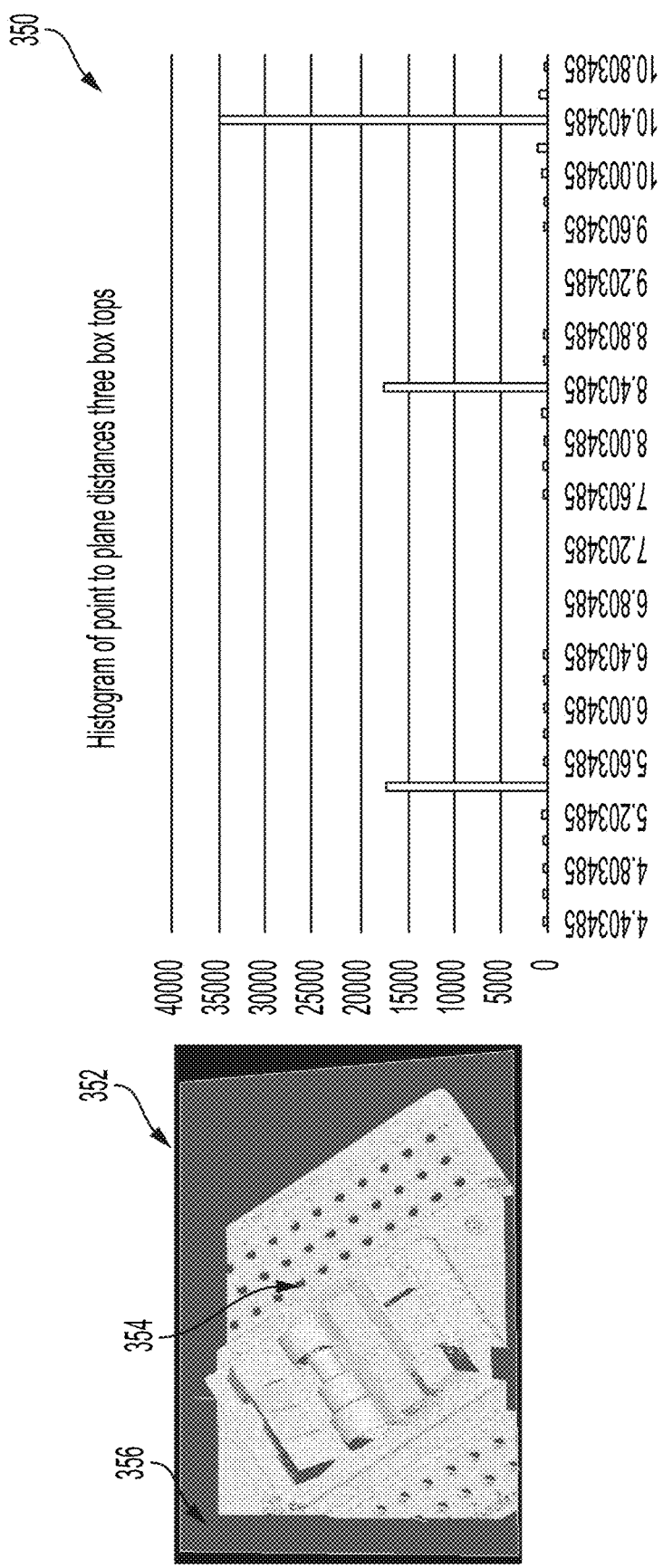

FIG. 3A shows two exemplary point-to-plane histograms of a cityscape object, according to some embodiments. FIG. 3A shows an exemplary histogram 300 of point to plane distances for the point cloud 302 of the cylindrically-shaped object within the box 304 to the plane 306 (which is disposed at the base of the box 304). The X axis of the histogram 300 represents distance from the reference plane 306, and the Y axis represents the number of points with a particular distance. FIG. 3A also shows an exemplary histogram 350 of point to plane distances for the point cloud 352 of the three planar surfaces within the box 354 to the plane 356 (which is, again, disposed at the base of the box 354). Like histogram 300, the X axis of the histogram 350 represents distance from the reference plane 356, and the Y axis represents the number of points with a particular distance. As described herein, the histogram distances in these examples were computed by determining a shortest distance for each point to the reference plane.

In some embodiments, as described herein the histograms 300 and 350 can be compared (e.g., to determine whether the objects captured by the 3D images are similar (or not)). The similarity score between the two histograms 300 and 350 is 0.296643, where the computed score value can range from 0 to 1.0, with 1.0 indicating the two compared histograms are identical, while a value of 0 indicates the least similarity. Therefore, in this example a score of 0.296643 is indicative of the objects within the areas 304, 354 not being similar. The similarity score for this example was computed using a histogram intersection measure by comparing the sum of the minimums of the normalized frequencies over all of the bins between the two histograms.

Figure 3B:
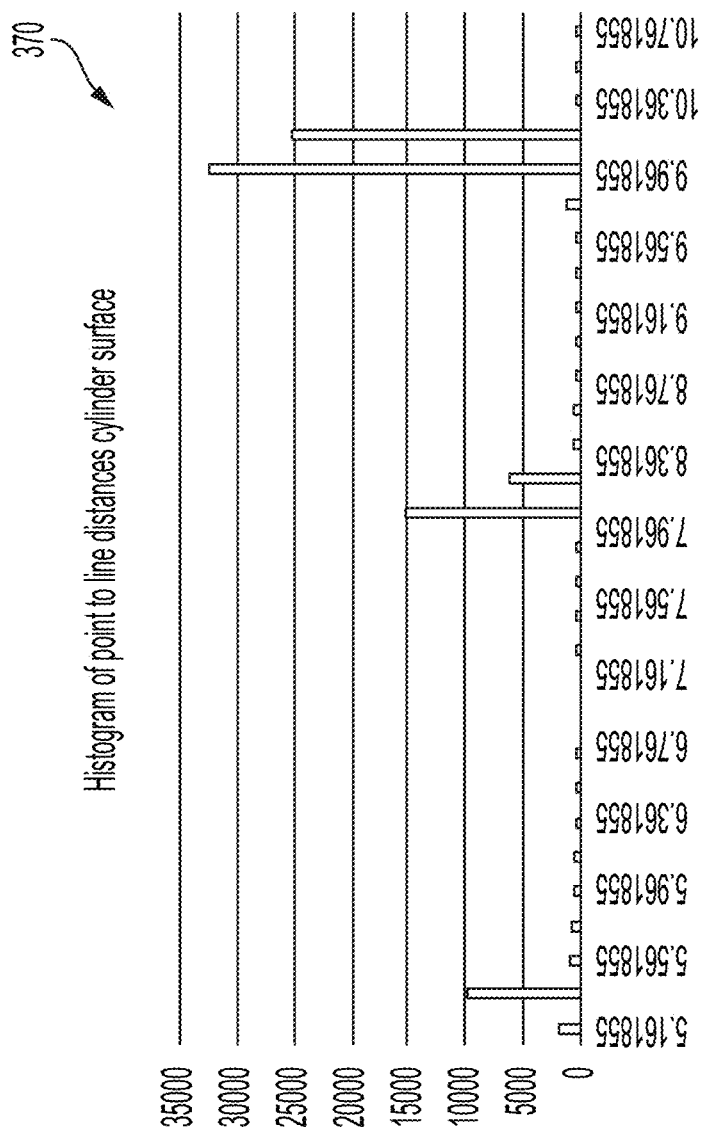
FIG. 3B shows two exemplary point-to-line histograms, according to some embodiments.
Figure 3B:
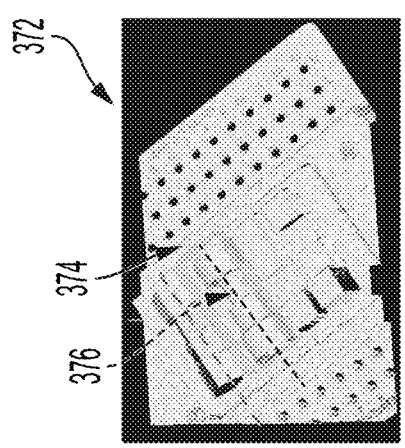
Figure 3B:
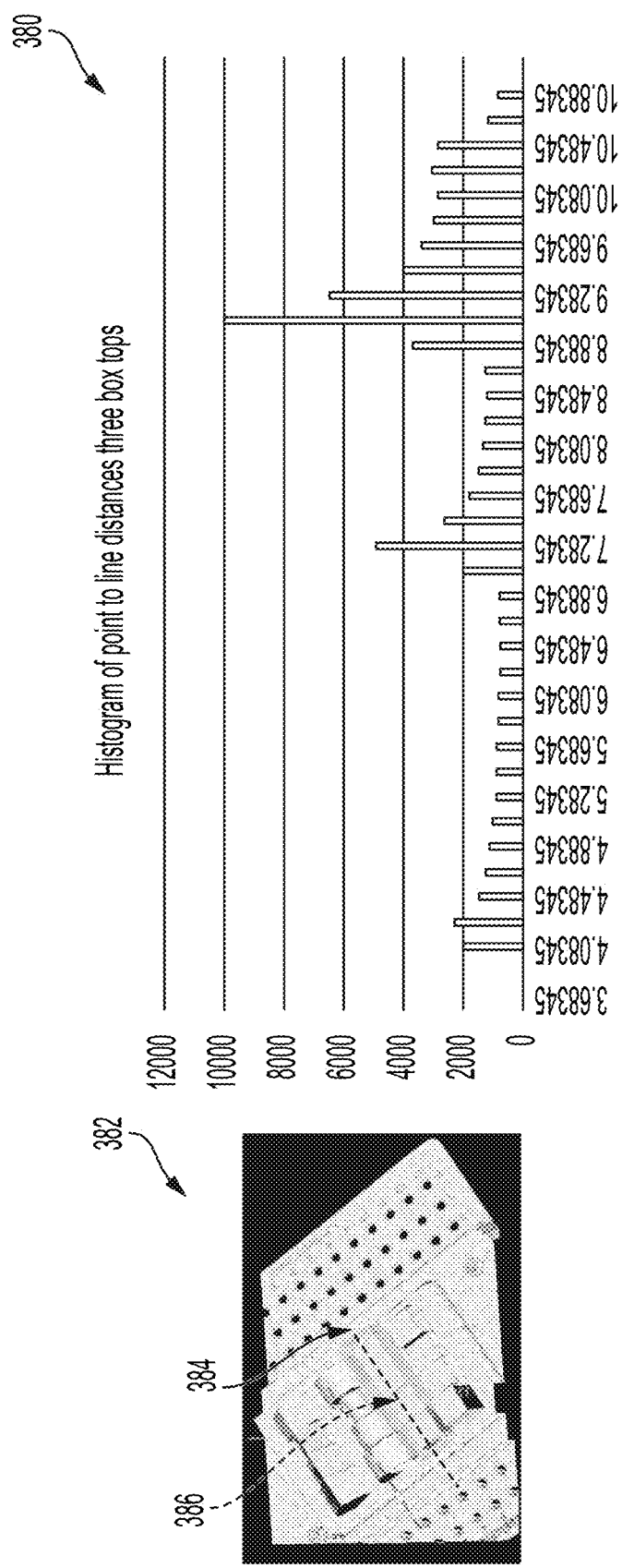

FIG. 3B shows two exemplary point-to-line histograms of a cityscape object, according to some embodiments. FIG. 3B shows an exemplary histogram 370 of point to line distances for the point cloud 372 of the cylindrically-shaped object within the box 374 to the line 376 (the axis of the cylinder). FIG. 3B also shows an exemplary histogram 380 of point to line distances for the point cloud 382 of the three planar surfaces within the box 384 to the line 386. The X axis of the histograms 370 and 380 represents distance from the respective reference lines 376 and 386, and the Y axis represents the number of points with a particular shortest distance. The similarity score between the two histograms 300 and 380 is 0.191645, where the computed score value can range from 0 to 1.0, with 1.0 indicating the two compared histograms are identical, while a value of 0 indicates the least similarity. As with FIG. 3A, the score was computed using the sum of the minimums of the normalized frequencies. Therefore, in this example a score of 0.191645 is indicative of the objects within the areas 374, 384 not being similar.

Figure 4:
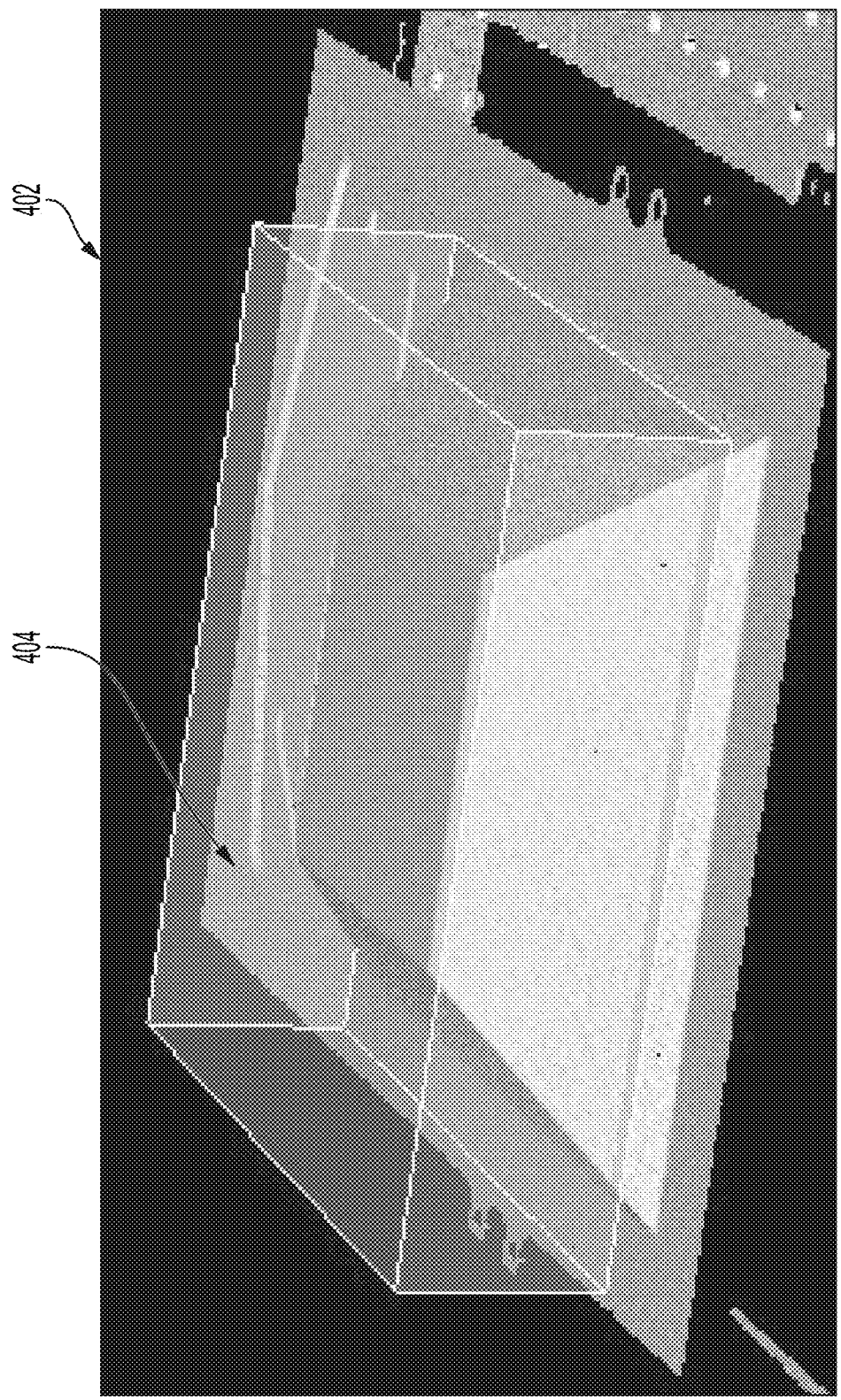
FIG. 4 shows two exemplary point to center of mass distance histograms, according to some embodiments.
Figure 4:
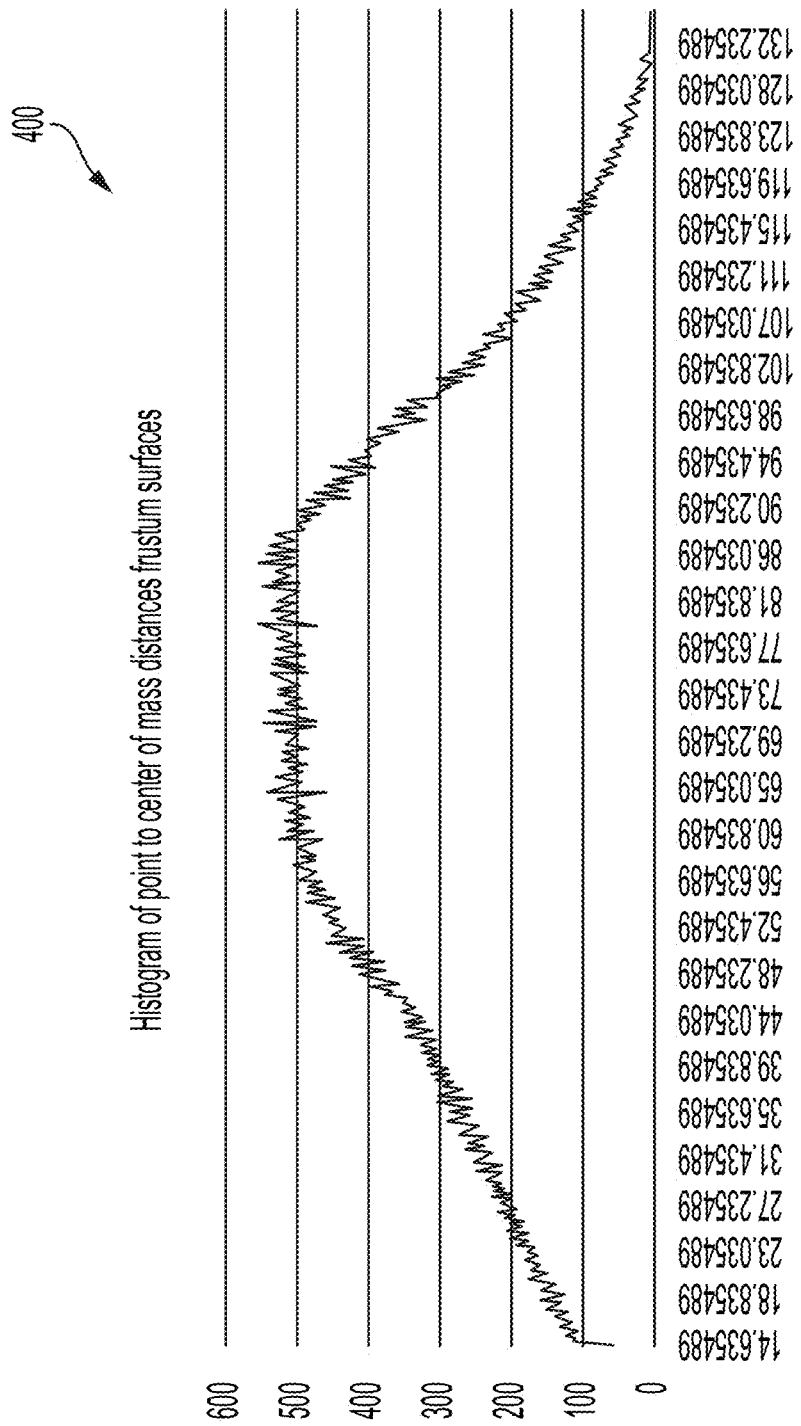
Figure 4:
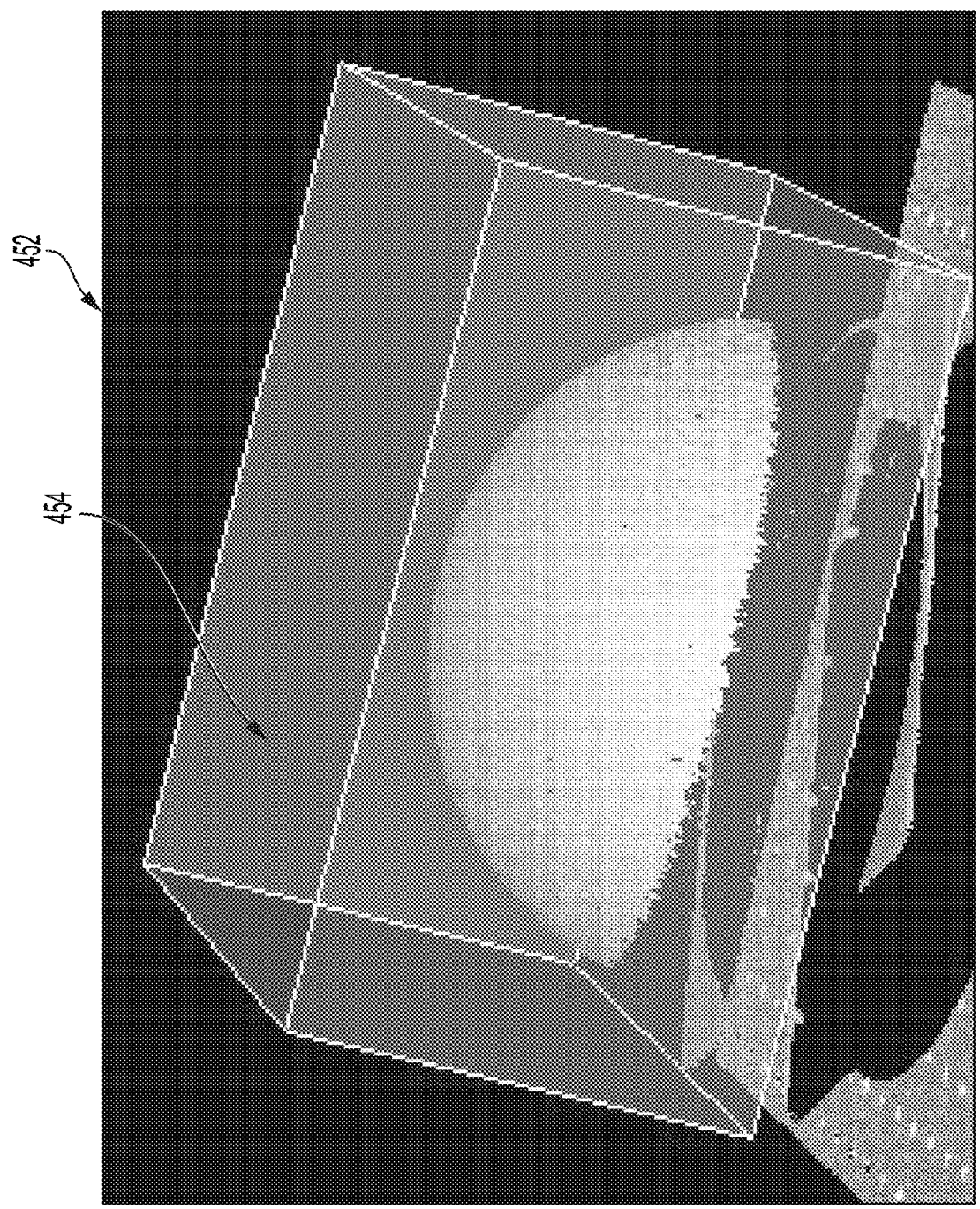
Figure 4:
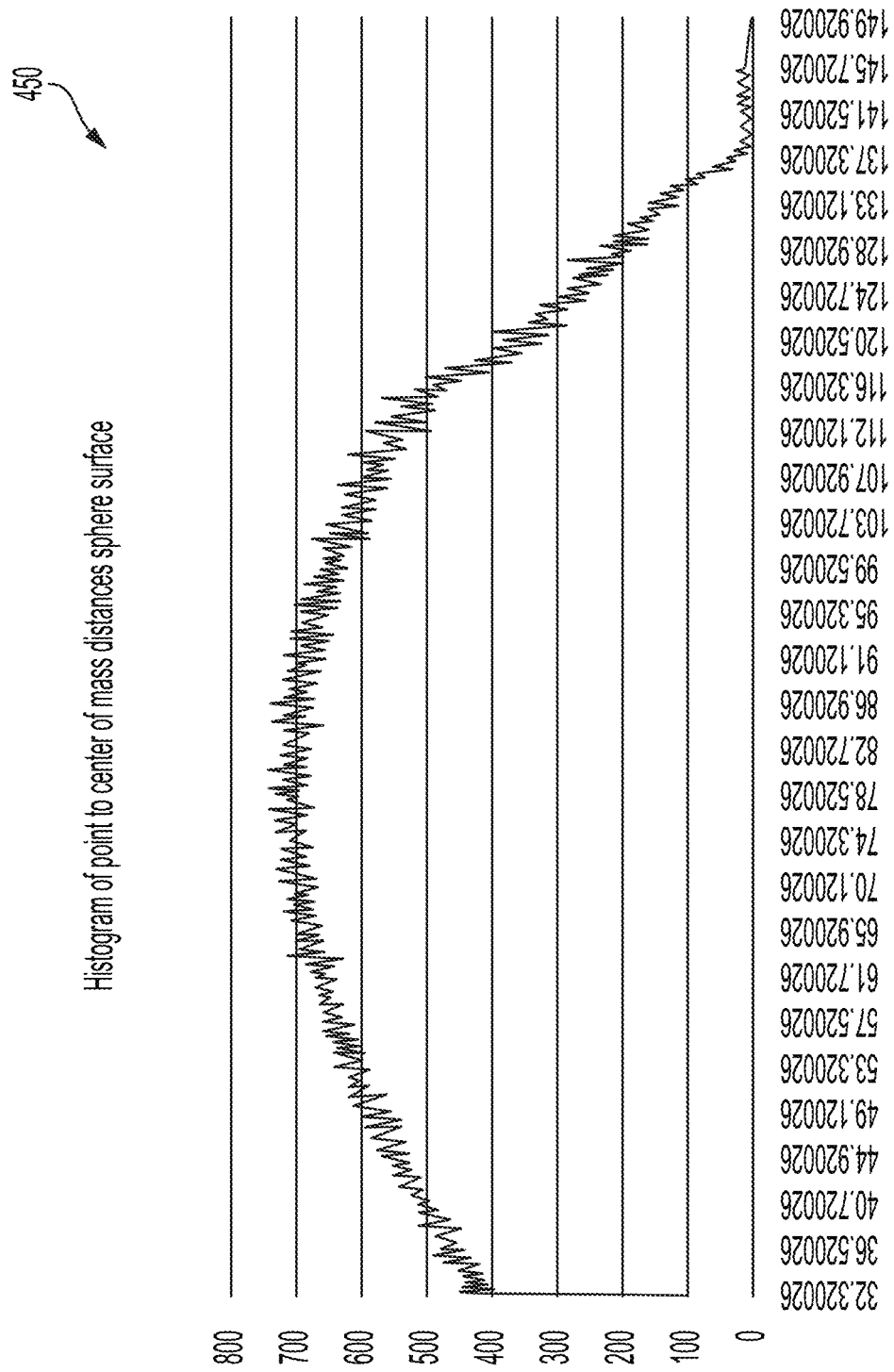

FIG. 4 shows two exemplary point to center of mass distance histograms, according to some embodiments. FIG. 4 shows an exemplary histogram 400 of point to center of mass distances for the point cloud 402 of the frustum surfaces within the box 404. FIG. 4 also shows an exemplary histogram 450 of point to center of mass distances for the point cloud 452 of the spherical surface within the box 454. The center of mass of the frustum and spherical surface are not shown in FIG. 4 since the center of mass is within the objects. The X axis of the histograms 400 and 450 represents distance from the associated center of mass, and the Y axis represents the number of points with a particular distance.

The similarity score of the two histograms 400 and 450 is 0.835731, indicating a higher similarity than the histograms 300 and 350 of FIG. 3A.

Figure 5:
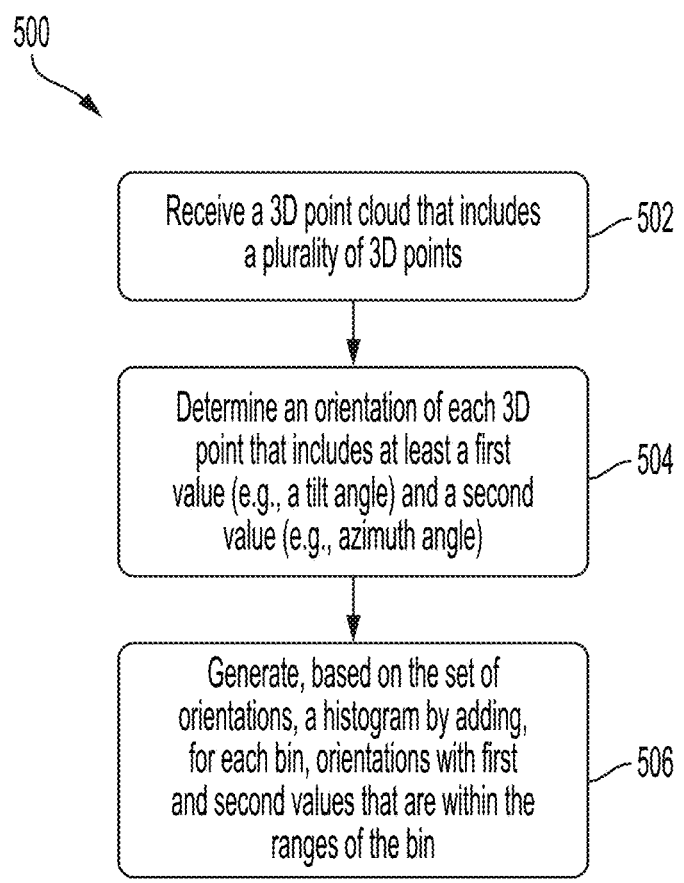
FIG. 5 is a flow chart of an exemplary computerized method for generating a histogram of a 3D point cloud, according to some embodiments.

According to some embodiments, the techniques can generate 2D histograms that are representative of 2D information (e.g., information associated with multiple of the x, y and z directions, etc.). For example, a 2D normal direction histogram can be generated to represent the distribution of the unit normal directions of the points in a 3D space. FIG. 5 is a diagram of an exemplary computerized method 500 for generating a histogram of a 3D point cloud, according to some embodiments. At step 502, the machine vision system receives a 3D point cloud that has a plurality of 3D points. At step 504, the machine vision system generates a set of orientations. The machine vision system determines, for each 3D point in the 3D point cloud, an orientation of the 3D point.

In some embodiments, the orientation includes a first value for a first component (e.g., a tilt angle) and a second value for a second component (e.g., an azimuth angle). According to some embodiments, for a direction or orientation, the tilt angle can be the angle of the direction from the positive Z-axis in the range from 0 to 180 degrees. The azimuthal angle can be the angle of the projection of the direction in the X-Y plane from the positive X axis in the range from 0 to 360 degrees. The azimuthal angle can be periodic with a period of 360 degrees.

At step 506, the machine vision system generates, based on the set of orientations, a histogram. The histogram can bin orientations and/or values determined at step 504. In some embodiments, the histogram includes a set of two-dimensionally oriented bins. For example, each bin can be associated with a first range of values of the first component (e.g., a tilt index for the bin) and a second range of values of the second component (e.g., an azimuth index for the bin). The machine vision system generates the histogram by adding, for each bin, orientations with first and second values that are within the first and second ranges of values, respectively, that are associated with the bin to quantize each 3D point to a bin. As described herein, adding can include, for example, determining a count of points with values within particular component ranges to generate each entry of the histogram, e.g., such that a point is considered to belong to an entry of the histogram by discretizing/quantizing its values.

According to some embodiments, referring to steps 504-506, the unit normal at each point can be an ordered pair of tilt and azimuth angles. The normal direction histogram can be a 2D image, with the two dimensions being tilt and azimuth. Each row and column of the 2D histogram image can correspond to a bin of tilt and azimuth, respectively. The numbers of rows and columns can be determined by the range of tilt and azimuthal angle ranges, respectively, and the bin size. Each value at a given pixel or bin conveys the count (e.g., frequency) of normal directions whose tilt and azimuth fall into the bin.

According to some embodiments, the 2D histogram can be computed by performing a set of steps for each 3D point within the region of interest. For each 3D point, the machine vision system can compute its tilt and azimuthal angles, quantize each by the bin size to determine the tilt angle bin (e.g., tilt index) and the azimuthal angle bin (e.g., azimuth index), and increase the pixel/bin value indexed at the above indices of tilt and azimuth by 1.

According to some embodiments, an optional secondary image, such as a centroid image, can be determined. The centroid image can be, for example, a three-tuple image, with as many pixels or bins as the direction histogram. The value in each bin with indices (i, j) of the secondary image can be the 3D centroid of the positions of the points of the point cloud where the normal direction lies in the bin (i, j) of the direction histogram.

As described herein, according to some embodiments the 3D point cloud can be processed before generating the histogram, such as voxelizing the 3D point cloud. The machine vision system can generate a 3D voxel grid for at least a portion of the 3D point cloud. The machine vision system can determine, for each voxel of the 3D voxel grid, whether the location of one or more of the plurality of 3D data points falls within the voxel to generate an associated set of 3D points for the voxel.

According to some embodiments, the voxels can store its associated set of 3D points, a representative point or set of points, normals or other vectors, and/or the like. According to some embodiments, the machine vision system can determine a representative normal or vector for the voxel. For example, for each voxel of the 3D voxel grid, the machine vision system can determine a surface normal and/or orientation of the representative 3D data point of the voxel (e.g., a mean point) to generate the set of orientations. As another example, the machine vision system can use the associated set of 3D point locations, neighbor 3D data point locations and/or information from the 3D sensor to determine a surface normal vector. In some embodiments, if a voxel is not associated with any 3D points, the voxel can be set to zero. In some embodiments, the techniques can include determining a representative normal or vector for each voxel based on the associated set of 3D data points. For example, the representative vector can be determined by calculating a component-wise average, by extracting Eigen vectors from an accumulated matrix (e.g., formed by accumulating an outer product of each vector with itself, $vv^T$), and/or the like. As a further example, the techniques can include determining a vector for each of the associated 3D points and storing a set of vectors.

Referring to the computerized method 500, according to some embodiments when a voxel grid is used to represent a 3D point cloud at step 502, an orientation at step 504 is determined using the surface normal and/or orientation of the representative 3D data point of each voxel to generate a set of orientations for producing the histogram at step 506.

The 2D histogram can be generated to represent various aspects of the 3D point cloud, including global aspects and/or local aspects. According to some embodiments, the histogram can be a global feature descriptor. For example, the set of orientations can be determined based on a fixed coordinate system associated with the 3D point cloud. Consider, for example, point clouds of a number of scenes, all expressed in some fixed coordinate system (e.g., a client coordinate system). The direction histogram computed from each point cloud, as it conveys information about a desired subset and/or the entire 3D point cloud as a whole, can be viewed as a global descriptor of the scene (e.g., in terms of the distribution of the orientations of surface point normals).

According to some embodiments, the histogram can be a local feature descriptor. For example, the set of orientations can be determined based on a local coordinate system associated with a 3D point of the 3D point cloud. For example, histograms can be computed anew at one or more points of the 3D point cloud. Given a 3D point of the point cloud, the machine vision system can establish a local coordinate system based on the 3D point, with the origin of the local coordinate system at said point. The tilt and azimuth angles of the directions of the 3D point cloud can be computed in the local coordinate system, and, upon being binned as described herein, serve as a local descriptor.

Various techniques can be used to obtain a local 3D coordinate system at a given point of the point cloud. According to some examples, the machine vision system can select an initial local 3D coordinate frame, with its origin at the point and with its Z axis aligned with the point's normal direction (e.g., where X and Y axes are arbitrary). The machine vision system can establish the final local coordinate frame by fixing its X axis by first finding its K nearest neighbors, and using their normals to compute a direction histogram in the initial local 3D space. The machine vision system can identify the 2D bin location of the first distinguishable highest-frequency peak (e.g., along the increasing direction of azimuth angle) of the histogram and use the direction of its azimuth angle as the X axis of the signature coordinate frame. Each point's final local coordinate system can be dependent on the geometry of the point's neighborhood (e.g., such that it can be invariant to changes in the point cloud sampling and object pose).

Figure 6:
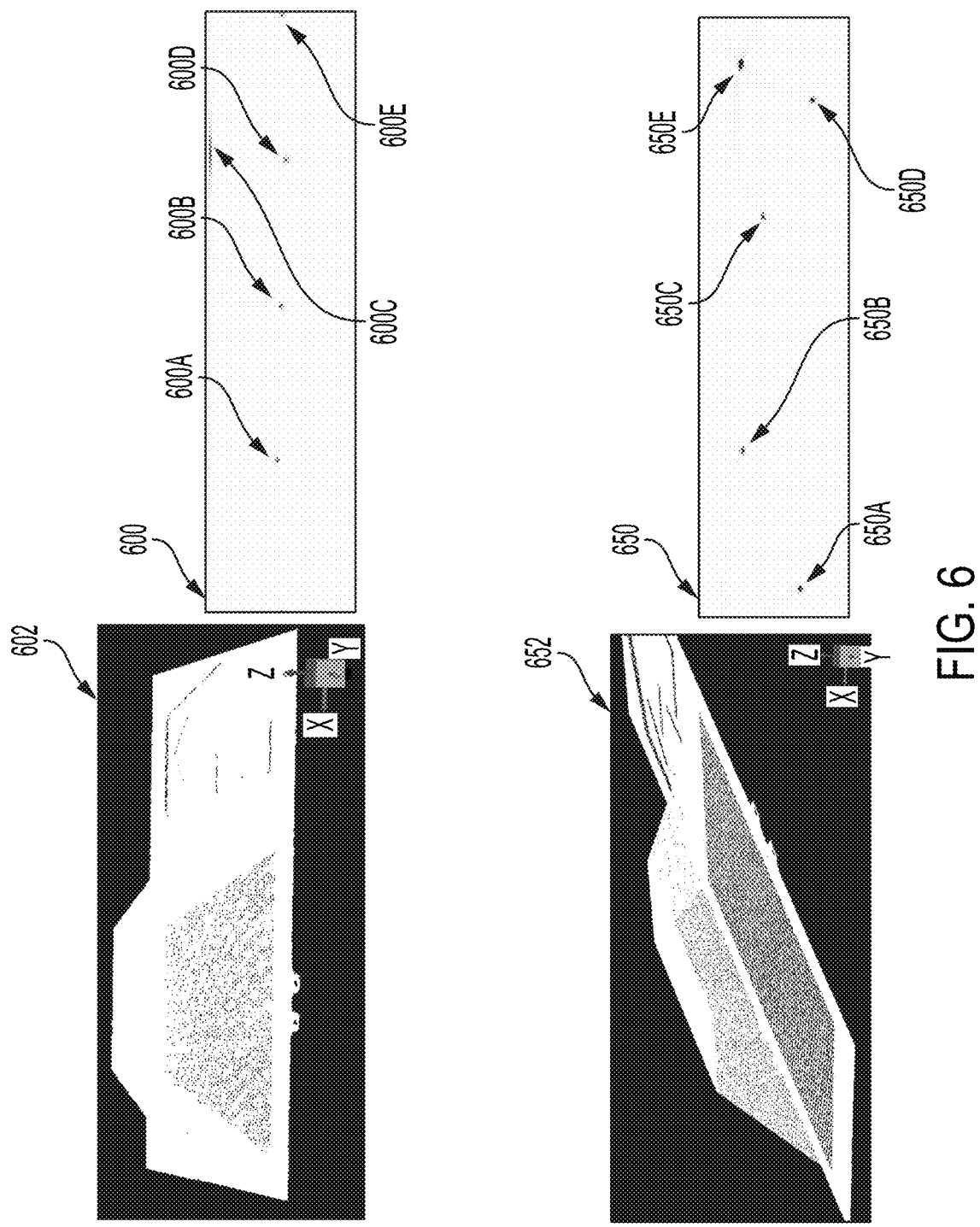
FIG. 6 shows two exemplary normal direction histograms for point cloud data of a frustum, according to some embodiments.

FIG. 6 shows two exemplary normal direction histograms for point cloud data of a frustum, according to some embodiments. FIG. 6 shows an exemplary histogram 600 of normals for the point cloud 602 of the frustum object at a first pose. FIG. 6 also shows an exemplary histogram 650 of normals for the point cloud 652 of the frustum object at a second pose. Both histograms 600, 650 show five significant peaks (600A-600E and 650A-650E, respectively), each corresponding to a planar patch of the frustum object. The horizontal directions of the images 600 and 650 represent the azimuth bins covering the azimuth angle range from 0 to 360 degrees, and their vertical directions represents tilt bins covering the tilt angle range from 0 to 90 degrees. In image 600 the five peaks are 600A: (91, 42), 600B: (183, 44), 600C: (275, 2), 600D: (271, 47), 600E: (358, 45); in image 650 the five peaks are 650A: (17, 60), 650B: (99, 25), 650C: (240, 38), 650D: (309, 67), 650E: (331, 24), where the first and second coordinates of a pixel location respectively indicate the azimuth and tilt angles in degrees.

Figure 7:
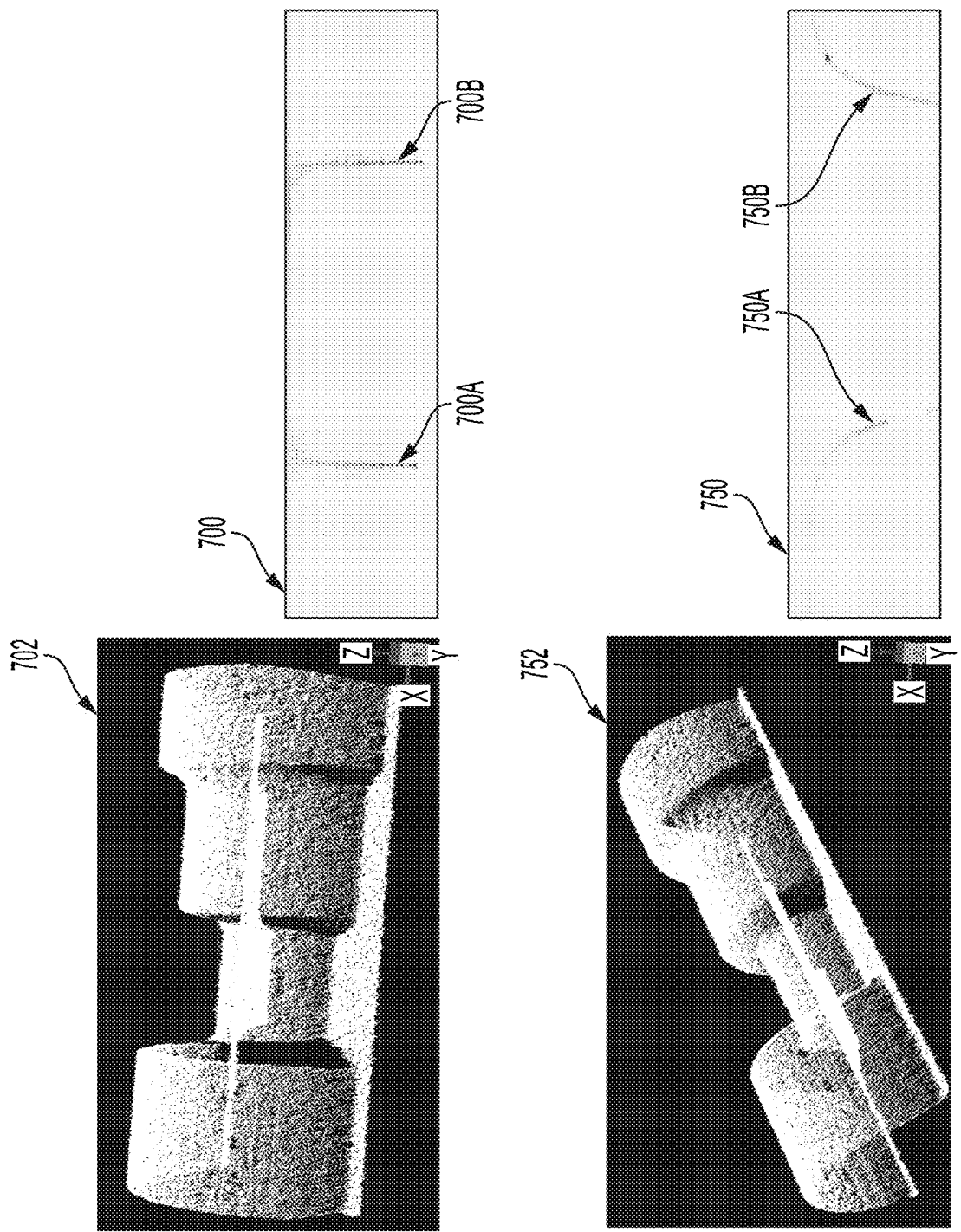
FIG. 7 shows two exemplary normal direction histograms for point cloud data of a cylindrically-shaped object, according to some embodiments.

FIG. 7 shows two exemplary normal direction histograms for point cloud data of a cylindrically-shaped object, according to some embodiments. FIG. 7 shows an exemplary histogram 700 of normals for the point cloud 702 of a cylindrically-shaped object at a first pose. FIG. 7 also shows an exemplary histogram 750 of normals for the point cloud 752 of the cylindrically-shaped object at a second (different) pose. The horizontal directions of the images 700 and 750 represent the azimuth bins covering the azimuth angle range from 0 to 360 degrees, and their vertical directions represents tilt bins covering the tilt angle range from 0 to 90 degrees.

Both histograms 700, 750 show significantly strong ridges. As can be seen in images 702 and 752, the part is made of concentric cylindric surfaces which share a common axis. For each surface point of the part, its normal is perpendicular (conceptually) to the common axis and points away from the common axis. The normals of the surface points are therefore more or less located in a same three-dimensional plane which is perpendicular to the common axis. Consider, for example, a 3D circle of unit radius that is perpendicular to the common axis: all the unit normals have their staring points at the center of the unit circle and the ending points are located on the circle, occupying a certain arc segment of the circle.

In image 702, the part is positioned such that its axis is roughly aligned to the X direction of the 3D coordinate space of the point cloud; when projecting the normals of the surface points to the XY domain, their projections will be located on one line in the XY domain (e.g., corresponding to two opposite directions which have the azimuth angle difference of 180 degrees). This is reflected by the two (almost) vertical ridges 700A and 700B shown in image 700, whose azimuth distance is about half of the entire X dimension (360 degrees). As another example, when projecting the normals of the surface points to the Z axis of the coordinate space, the projection will take tilt values from 0 to a maximum tilt angle (<90 degrees) depending on the field of view of the 3D sensor that was used to capture the point cloud.

In image 752, the part is rotated from that in image 700 and the normal of each surface point is no longer perpendicular to the X direction since the part's common axis is not parallel to the X axis. When the normals of the surface points are projected respectively to the XY domain and the Z axis of the 3D coordinate space, it is conceptually like projecting the points of their representing 3D circle (for the covered arc segment) to the XY domain and the Z axis, which shows connected ridges 750A and 750B in image 750. Ridge 750A appears broken because it is a flipped U shape, which is split at the azimuth angle 360 degrees since the azimuth direction is periodic with period 360 degrees.

Figure 8:
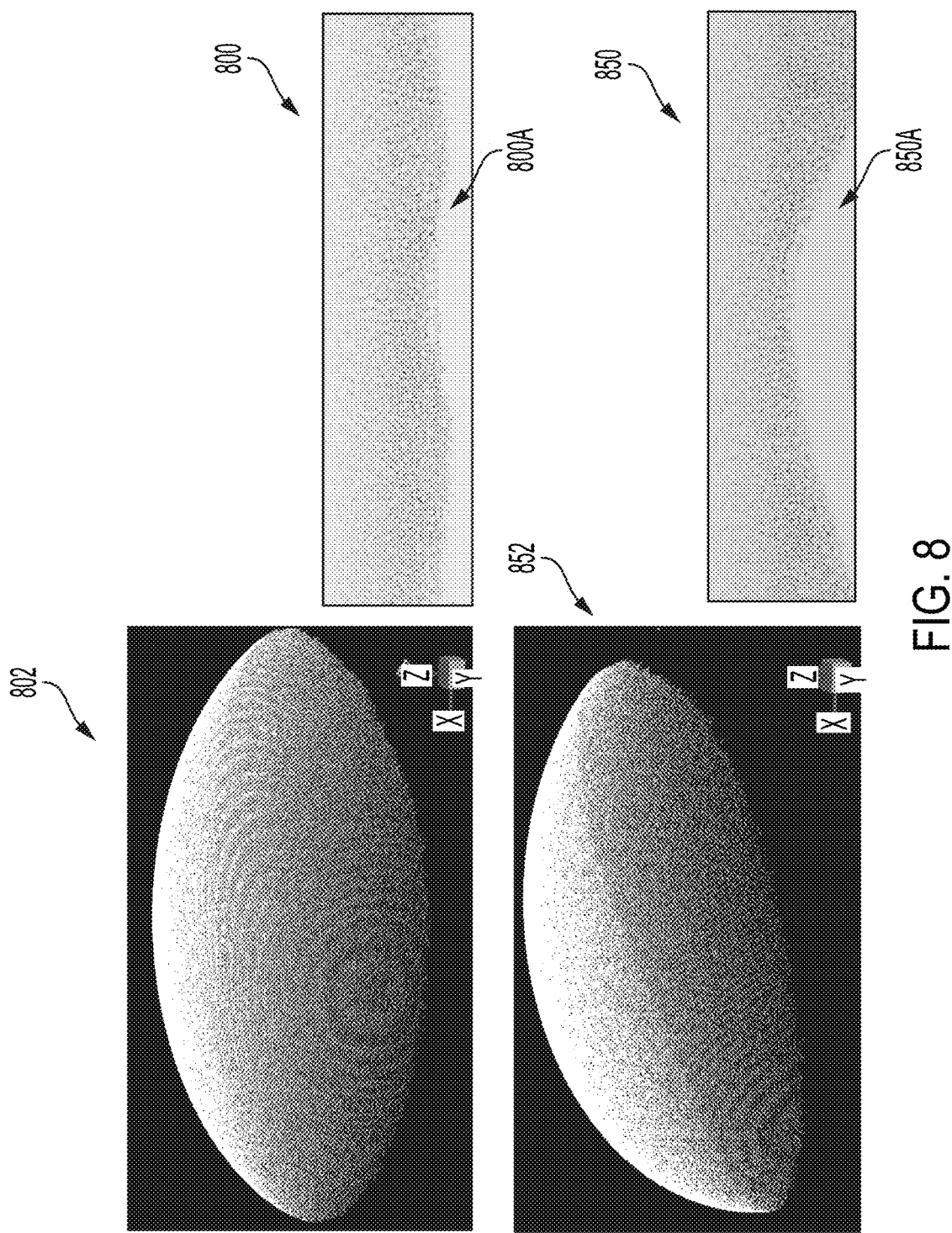
FIG. 8 shows two exemplary normal direction histograms of a hemispherically-shaped object, according to some embodiments.

FIG. 8 shows two exemplary normal direction histograms of a hemispherically-shaped object, according to some embodiments. FIG. 8 shows an exemplary histogram 800 of normals for the point cloud 802 of the hemisphere at a first pose. FIG. 8 also shows an exemplary histogram 850 of normals for the point cloud 852 of the hemisphere at a second pose. Both histograms 800, 850 show a uniform distribution of normal directions. The horizontal directions of the histograms 800 and 850 represent the azimuth bins covering the azimuth angle range from 0 to 360 degrees, and their vertical directions represents tilt bins covering the tilt angle range from 0 to 90 degrees.

In both images 800 and 850, there are some "blank" spaces 800A and 850A that correspond to the tilt angle range to which no normal of the sphere surface points can be projected. The "blank" portions occur near the high-end of the tilt direction. As an example, consider a setup where a sphere (e.g., a ball) is imaged by a 3D sensor looking down at the ball from the top. The 3D sensor usually can only capture a certain portion of the top of the sphere surface that is near to the sensor, and how much it can observe typically depends on the sensor's field of the view (FOV) and its distance/pose to the sphere. Since in this example the 2D histogram image is fixed in its tilt dimension (covering 90 degrees), the surface portion outside the sensor's FOV but still on the upper hemisphere cannot be captured by the sensor. Thus, in this example there are no points on the sphere' point cloud with tilt angles larger than the max viewing angle of the sensor (which is <90 degrees due to the perspective sensing model).

Figure 9:
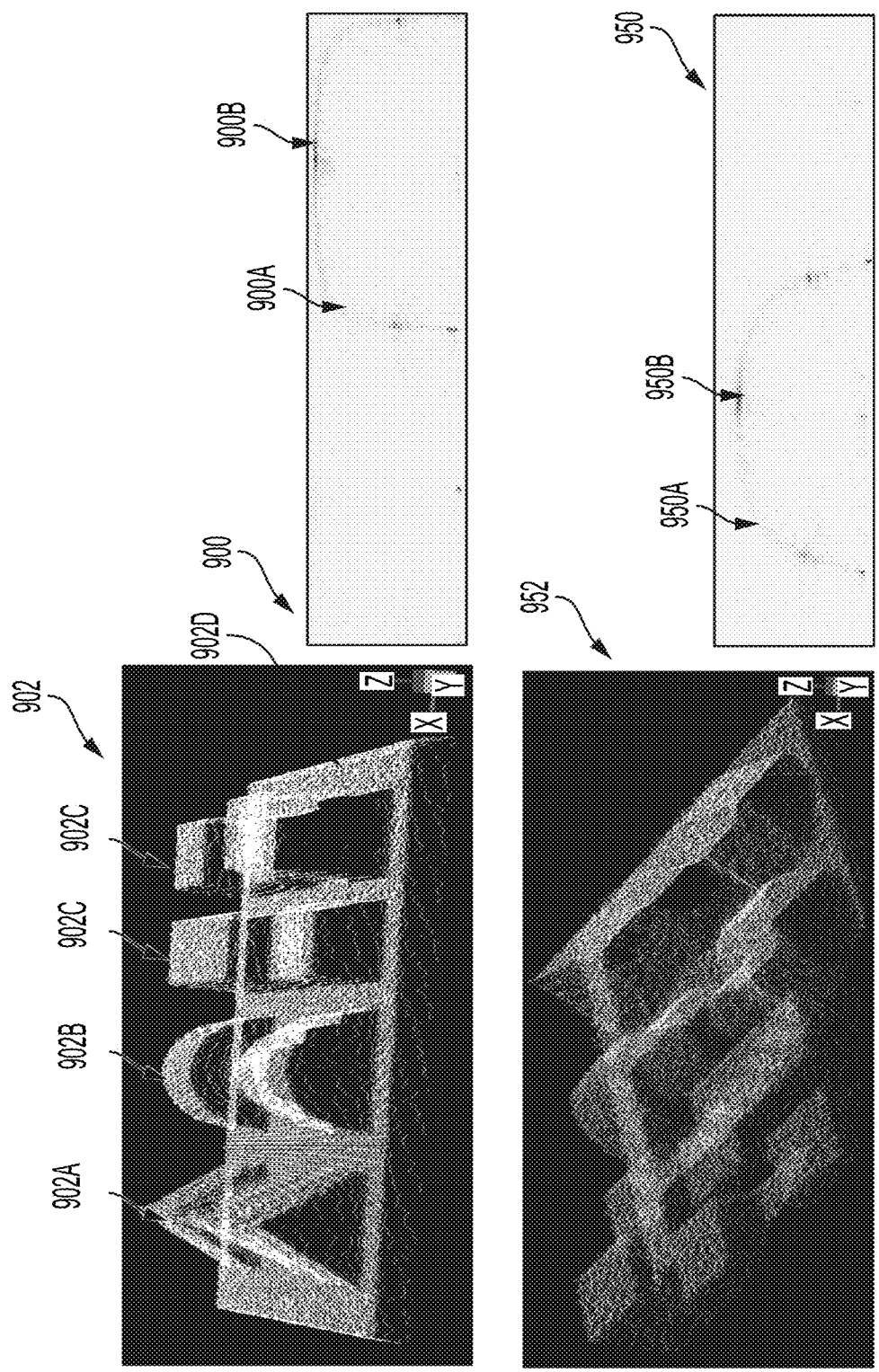
FIG. 9 shows two exemplary normal direction histograms of a cityscape object, according to some embodiments.

FIG. 9 shows two exemplary normal direction histograms of a cityscape object, according to some embodiments. FIG. 9 shows an exemplary histogram 900 of normals for the point cloud 902 of the cityscape object at a first pose. FIG. 9 also shows an exemplary histogram 950 of normals for the point cloud 952 of the cityscape object at a second (different) pose. The horizontal directions of histograms 900, 950 represent the azimuth bins covering the azimuth angle range from 0 to 360 degrees, and their vertical directions represents tilt bins covering the tilt angle range from 0 to 90 degrees.

Both histograms 900, 950 show a similar pattern of normal directions, but with shift and rotation between them. In particular, the U-shape pattern 900A in the histogram 900 appears as U-shape pattern 950A that is the left and down in histogram 950. In FIG. 9, a same part is used to capture the point clouds, but with different poses relative to the 3D sensor. This part is made of multiple sub-parts: roof surface 902A (characterized by several pairs of planar surfaces forming a triangle roof), concentric cylindric surfaces 902B (which are the same as those shown in FIG. 7), two rows 902C of box tops, and the base surface 902D. The histograms shown in images 900 and 950 reflect the combination of the normal information of the surfaces of these sub-parts. As shown in FIG. 7, the histogram of the concentric cylindric surface is a "U" shape ridge and both its tilt and azimuth angles are more spread than that of other sub-parts. For the two rows of the box tops and the base surface, their normal directions are all similar and they contribute a single peak in the 2D histogram image. The roof sub-part is made of several pairs of planar patches, each patch has small area; as a result, its histogram is characterized by a limited number of peaks. By combing all the histograms of these sub-parts, the overall histograms are shown in images 900 and 950 at two different poses, where the U-shapes 900A, 950A correspond to the concentric cylindric surface, and the highest peaks 900B, 950B (with the maximum frequency, indicated by the darkest pixel) corresponds to the normal of the two rows of box tops 902C and the base surface 902D.

According to some embodiments, the 1D and 2D histograms can be analyzed to interpret the 3D point cloud. The techniques can include comparing two (or more) histograms to compute scores that are indicative of a similarity between/ among the histograms. According to some embodiments, the 1D histograms can be used to measure similarity between two sets of points. As described herein, each 1D distance-based histogram can provide an effective fingerprint for characterizing 3D point cloud data sets. Variant scoring methods (e.g., histogram intersection, Bhattacharyya measure, and normalized cross correlation, etc.) can be used to compute the similarity between two 1D histograms for evaluating how much their represented points appear similar.

In some embodiments, 1D histograms can be compared using one or a plurality of scoring metrics. For example, to compare two 1D histograms, the machine vision system can use one or more of four scoring metrics, which are respectively based on intersection, dot-product, Bhattacharyya measure, and normalized cross correlation.

In some embodiments, the machine vision system determines an intersection-based score by determining, for each bin, the lesser of the two values of relative frequency for that bin (one from each histogram). The machine vision system can compute a score as the sum, across all bins, of these lesser values of relative frequency.

In some embodiments, the dot-product and Bhattacharyya-measure based scores both involve calculating, for each bin, the product of the two values of relative frequency for that bin. The machine vision system can compute the dot-product score by computing the sum, across all bins, of these bin-wise products. The machine vision system can compute the Bhattacharyya score by computing the sum, across all bins, of the square root of these bin-wise products.

In some embodiments, the machine vision system can compute the score based on Normalized Cross Correlation (NCC) by calculating (NCC+1)/2. The machine vision system can compute the NCC by dividing the dot-product score described above by two factors (one per histogram). These factors can be, for each histogram, the root-mean-square values of the relative frequency distributions.

In some embodiments, each 1D histogram can be first normalized to produce a relative frequency distribution that sums to one. The similarity score can then be computed based on the two relative frequency distributions. Regardless of which measure the machine vision system uses, the resulting score can be in the range of 0 to 1, where the larger the score, the more similar the two histograms.

In some embodiments, to compare two 2D histograms, the bin locations of a set of high frequencies can be identified for each histogram. These bins can represent the dominant 3D directions of the histogram using the frequency peaks. At each frequency peak bin, its X and Y components respectively indicate the azimuth and tilt bin locations at which the peak occurs; its Z component indicates the frequency of the peak. In some embodiments, noise removal techniques can be first applied to the histogram to filter out the bins with frequencies less than a predetermined significance threshold.

In some embodiments, the machine vision system can identify a frequency peak by locating a 2D blob (e.g., a connected component) in the filtered histogram that is characterized by a compact cluster of adjacent non-zero frequency bins. The location (X, Y) of a peak can be the center of mass of its constituent bins (e.g., the average of azimuth and tilt bin locations weighted by their frequencies); the frequency value (Z) of a peak is the sum of the frequency values of its constituent bins. In some embodiments, if there are no significant high frequency bins in a histogram, the average of all directions can be designated as the dominant direction.

In some embodiments, the machine vision system can seek a rotation that best aligns the dominant directions, in order to minimize the difference in the 3D directions conveyed by the two sets of peak locations. The machine visions system can obtain a rigid transform corresponding to this best rotation.

In some embodiments, a measure of goodness of the rotation—referred to for illustrative purposes as the rotation-score—is computed based on the distance between frequency peaks deemed as corresponding peaks. In some embodiments, the machine vision system first calculates the average of the Euclidean distances between the tips of unit vectors of the directions of corresponding frequency peaks. The rotation-score can be computed as one minus this averaged distance.

Another example of a score that can be computed is a frequency-match-score. For each bin of the first histogram whose frequency value is non-zero, the machine vision system can rotate the representative direction (e.g., taken to be the center of the bin) by the above transform to obtain a mapped direction. The mapped direction falls in the set of directions corresponding to one of the bins of the second histogram. If multiple bins of the first histogram are mapped to a bin of the second histogram, their frequencies are added up to obtain a revised frequency. Thus, the first histogram is mapped to the space of the second histogram. For each bin, a measure is computed of the overlap of two frequencies relating to the bin—the second histogram's frequency and the mapped frequency of the first histogram. This overlap measure is the ratio of the lesser of these two frequencies to the greater of the two frequencies. Next, the machine vision system computes the average of these bin-wise overlap measures across all bins with non-zero frequency content. Finally, the machine vision system computes a frequency-match-score as the value obtained by applying to the averaged overlap measure a piecewise quadratic S-shaped function. It can be beneficial to applying the S-shaped function to, for example, push middling values towards either 0 or 1.

In some embodiments, the overall similarity score between the two 2D histogram can be computed as the product of the rotation-score and frequency-match-score. As with scores for 1D histograms, the score can be in the range 0 to 1, where the larger the score, the more similar the two histograms.

According to some embodiments, the 2D normal direction histograms can be used to measure similarity between two object surfaces. In a 2D histogram of directions, a column distance can linearly reflect the difference of azimuthal angles (subject to the period of 360 degrees) while a row distance can linearly reflect the difference of tilt angles. According to some embodiments, histograms calculated of different portions of a 3D point cloud and/or at different viewpoints of a scene can be related by matching a portion of the histograms. For example, different histograms can be compared by matching one or more peaks of one histogram with one or more peaks of another histogram to determine a correspondence between at least a portion of the first set of peaks to at least a portion of the second set of peaks. Consider, for example, two point-clouds acquired by imaging the same object in two different poses. The machine visions system can identify locations of peaks in the two histograms computed for the two point clouds, and establish a correspondence between these peaks of frequencies. Such correspondences can allow, for example, the machine vision system to estimate the rotation of the object from one view to the next. In a similar way, the translation between views can also be estimated from histograms of centroid images.

According to some embodiments, 1D histograms can be generated based on the 2D histograms. For example, two 1D direction histograms (e.g., related to tilt and azimuthal angles) can be derived from a 2D histogram by taking the row/column sum of the pixel values of the 2D image. Each 1D direction histogram can provide an effective feature for characterizing object surfaces. Such a 1D histogram can be a useful signature whenever the surfaces are fixtured, as can be done using 3D-based registration. Like the 1D distance-based histograms, variant scoring methods can be adopted to compute the similarity between two 1D direction histograms representing two surfaces.

As described herein, the techniques can be used to create global descriptors, such as normal direction histograms that provide global feature descriptors. A global histogram can be consumed by existing image processing techniques for variant applications, such as for object identification, classification, registration, and/or the like. According to some embodiments, the peaks of the highest frequencies can be extracted from the histogram. Such peaks can, for example, provide useful statistical information about the nature of object surfaces. Each peak can correspond to a dominant surface normal orientation in the coordinate space, and its frequency can indicate the number of points whose surface normals are in the orientation. Therefore, each peak can be characterized by an orientation and a frequency. Given a frequency threshold, the machine vision system can identify all the peaks whose frequencies exceed the threshold. The resulting peaks can represent an object by the number of the peaks and the relation of their representing orientations.

As described herein, the techniques can be used to create local descriptors, such as local direction histograms. According to some embodiments, local direction histograms can represent a point cloud using key points. For example, a key point of a point cloud can be characterized by its local direction histogram that has a frequency of peaks on some non-zero rows (e.g., peaks not on row 0). A point can be considered a key point if any qualified peak exists on any non-zero rows in its local direction histogram. A peak can be qualified if its corresponding frequency exceeds a threshold (e.g., a predetermined threshold). Each key point can be associated with a list of qualified peaks. Therefore, a point cloud of objects with changing curvature surfaces can be reduced to a set of its key points since the number of the key points is usually much smaller than that of original points. A key point can occur around a border between surface patches with different orientations. A non-key point can be located on a surface with a uniform direction (e.g., indicated by a large frequency sum on row 0 in the histogram), slowing changing normal directions, and/or the like. Compared to non-key points, key points may play a more important role in point-cloud based machine vision applications.

According to some embodiments, a local direction histogram can be used to search for objects using the correspondence between two sets of key points. For example, given an object, its key points can be extracted from the train-time point clouds acquired at typical acquisition poses to form reference models. At run time, key points can be extracted for each point cloud acquisition to form a run-time model in terms of a set of key points. A mathematical score can be computed between a pair of key points by comparing their corresponding peaks. For each correspondence of key points between a reference model and the run-time model, an overall score can be obtained by summarizing the match scores of the corresponding pairs of key points. Variant approaches can be used to correspond two sets of key points, such as RANSAC, and/or the like. The correspondence with the highest score can be used to decide the result.

According to some embodiments, a local direction histogram can be used to search for objects by comparing models of objects. For example, a model can be made for a point, which can include the point, its signature coordinate frame, the region of interest (ROI) around the point, and/or the local direction histogram computed using the points inside the ROI in the local coordinate frame. The comparison can be directly carried out between the histograms of the two involved models (e.g., one at the train-time and the other at the run time for a given point). For efficiency, the models can be built and searched at key points at both train and run times.

FIG. 10 is a table 1000 showing exemplary similarity scores computed using the 2D direction histograms described in conjunction with FIGS. 6-9, according to some embodiments. The images 652, 752, 852 and 952 from FIGS. 6-9 are used to represent the fingerprints used to determine the values in the columns and rows, namely the histograms 650, 750, 850 and 950, respectively, discussed in conjunction with FIGS. 6-9. As shown along the diagonal, when each histogram is compared with itself, a perfect score of 1.0 is achieved. None of the scores are above 0.28, indicating that none of the histograms are of similar objects. For this example, to compute the similarity of two 2D histograms, for each histogram its bins with the highest frequencies (e.g., peaks of frequencies that exceed a user-specified threshold) were identified, with each bin representing a dominant 3D orientation of its representing surfaces. As described herein, a highest peak can be presented as the center of mass of bins that are identified to belong a same blob in the histogram image. If both histograms contain sufficient frequency peaks, a fitting was adopted to relate their dominant directions for finding the best rotation between them as described herein (e.g., since the histograms could have been generated using images that captured the objects at different poses). A similarity score was then computed, as described herein, by considering the error from the estimation of the rotation and the similarity of frequencies between the two set of peak bins that are aligned by the rotation. If no significant high frequency bins were identified in any 2D histogram, a similarity score was computed using their derived 1D direction histograms of respective tilt and azimuth angles via correlation.

Embodiments discussed herein may be used in a variety of different applications, some of which may include, but are not limited to, part-picking in vision guided robotics, three-dimensional inspection, automotive kitting, molded plastic and cast metal volume inspection, and assembly inspection. Such applications can include searching for and identifying the location and orientation of a pattern of interest within images (e.g., to guide a robot gripper, or to inspect objects).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

Various aspects are described in this disclosure, which include, but are not limited to, the following aspects:

1. A computerized method for generating a histogram of a three-dimensional (3D) point cloud, the method comprising:
   receiving data indicative of a 3D point cloud comprising a plurality of 3D points;
   determining a reference in spatial relation to the 3D point cloud;
   determining, for each 3D point of the plurality of 3D points, a distance to the reference to generate a set of distances for the plurality of 3D points; and
   generating, based on the set of distances, a histogram comprising a set of entries, comprising inserting, for each entry of the set of entries, distances from the set of distances that are within a range of distances associated with the entry.
2. The method of 1, further comprising:
   generating a 3D voxel grid for at least a portion of the 3D point cloud, wherein each voxel of the 3D voxel grid comprises a same set of dimensions;
   determining, for each voxel of the 3D voxel grid, whether one or more of the plurality of 3D data points is within the voxel to generate an associated set of 3D points for the voxel;

determining, for each voxel of the 3D voxel grid with an associated set of 3D points, a single 3D data point for the voxel based on the associated set of 3D data points; and
storing the single 3D data point in the voxel.
3. The method of 2, wherein determining the set of distances comprises:
determining, for each voxel of the 3D voxel grid, a distance from the single 3D data point to the reference to generate the set of distances.
4. The method of any of 1-3, wherein:
the reference is a two-dimensional (2D) reference plane; and
determining the distance of each 3D point to generate the set of distances comprises determining a shortest distance of each 3D point to the reference plane.
5. The method of any of 1-4, wherein:
the reference is a reference line; and
determining the distance of each 3D point to generate the set of distances comprises determining a shortest distance of each 3D point to the reference line.
6. The method of any of 1-5, further comprising:
determining an estimated center of mass of the 3D point cloud, wherein the reference is the estimated center of mass.
7. The method of 6, wherein determining the distance of each 3D point to generate the set of distances comprises determining a distance of each 3D point to the estimated center of mass.
8. The method of any of 1-7, further comprising comparing the histogram with a second histogram generated for a second 3D point cloud to determine a measure of similarity between the 3D point cloud and the second 3D point cloud.
9. A non-transitory computer-readable media comprising instructions that, when executed by one or more processors on a computing device, are operable to cause the one or more processors to
generate a histogram of a three-dimensional (3D) point cloud, comprising:
receiving data indicative of a 3D point cloud comprising a plurality of 3D points;
determining a reference in spatial relation to the 3D point cloud;
determining, for each 3D point of the plurality of 3D points, a distance to the reference to generate a set of distances for the plurality of 3D points; and
generating, based on the set of distances, a histogram comprising a set of entries, comprising inserting, for each entry of the set of entries, distances from the set of distances that are within a range of distances associated with the entry.
10. The non-transitory computer-readable media of 9, wherein the instructions are further operable to cause the one or more processors to perform:
generating a 3D voxel grid for at least a portion of the 3D point cloud, wherein each voxel of the 3D voxel grid comprises a same set of dimensions;
determining, for each voxel of the 3D voxel grid, whether one or more of the plurality of 3D data points is within the voxel to generate an associated set of 3D points for the voxel;
determining, for each voxel of the 3D voxel grid with an associated set of 3D points, a single 3D data point for the voxel based on the associated set of 3D data points; and
storing the single 3D data point in the voxel.
11. The non-transitory computer-readable media of 10, wherein determining the set of distances comprises:
determining, for each voxel of the 3D voxel grid, a distance from the single 3D data point to the reference to generate the set of distances.
12. The non-transitory computer-readable media of any of 9-11, wherein:
the reference is a two-dimensional (2D) reference plane; and
determining the distance of each 3D point to generate the set of distances comprises determining a shortest distance of each 3D point to the reference plane.
13. The non-transitory computer-readable media of any of 9-12, wherein:
the reference is a reference line; and
determining the distance of each 3D point to generate the set of distances comprises determining a shortest distance of each 3D point to the reference line.
14. The non-transitory computer-readable media of any of 9-13, wherein the instructions are further operable to cause the one or more processors to perform:
determining an estimated center of mass of the 3D point cloud, wherein the reference is the estimated center of mass, comprising determining a distance of each 3D point to the estimated center of mass.
15. A system comprising a memory storing instructions, and at least one processor configured to execute the instructions to generate a histogram of a three-dimensional (3D) point cloud, comprising:
receiving data indicative of a 3D point cloud comprising a plurality of 3D points;
determining a reference in spatial relation to the 3D point cloud;
determining, for each 3D point of the plurality of 3D points, a distance to the reference to generate a set of distances for the plurality of 3D points; and
generating, based on the set of distances, a histogram comprising a set of entries, comprising inserting, for each entry of the set of entries, distances from the set of distances that are within a range of distances associated with the entry.
16. The system of 15, wherein the instructions are further operable to cause the at least one processor to perform:
generating a 3D voxel grid for at least a portion of the 3D point cloud, wherein each voxel of the 3D voxel grid comprises a same set of dimensions;
determining, for each voxel of the 3D voxel grid, whether one or more of the plurality of 3D data points is within the voxel to generate an associated set of 3D points for the voxel;
determining, for each voxel of the 3D voxel grid with an associated set of 3D points, a single 3D data point for the voxel based on the associated set of 3D data points; and
storing the single 3D data point in the voxel.
17. The system of 16, wherein determining the set of distances comprises:
determining, for each voxel of the 3D voxel grid, a distance from the single 3D data point to the reference to generate the set of distances.
18. The system of any of 15-17, wherein:
the reference is a two-dimensional (2D) reference plane; and
determining the distance of each 3D point to generate the set of distances comprises determining a shortest distance of each 3D point to the reference plane.

19. The system of any of 15-18, wherein:
the reference is a reference line; and
determining the distance of each 3D point to generate the set of distances comprises determining a shortest distance of each 3D point to the reference line.

20. The system of any of 15-20, wherein the instructions are further operable to cause the at least one processor to perform:
   determining an estimated center of mass of the 3D point cloud, wherein the reference is the estimated center of mass, comprising determining a distance of each 3D point to the estimated center of mass.

21. A computerized method for generating a histogram of a three-dimensional (3D) point cloud, the method comprising:
receiving data indicative of a 3D point cloud comprising a plurality of 3D points;
generating a set of orientations, comprising determining, for each 3D point in the 3D point cloud, an orientation of the 3D point, wherein the orientation comprises at least a first value for a first component and a second value for a second component;
generating, based on the set of orientations, a histogram comprising a set of bins, wherein:
each bin of the set of bins is associated with a first range of values of the first component and a second range of values of the second component; and
generating the histogram comprises adding, for each bin of the set of bins, orientations from the set of orientations with first and second values that are within the first and second ranges of values, respectively, associated with the bin.

22. The method of 21, wherein the set of bins are arranged in two dimensions, wherein the first dimension is associated with the first component and the second dimension is associated with the second component.

23. The method of any of 21-22, wherein the first component comprises a tilt angle and the second component comprises an azimuth angle.

24. The method of any of 21-23, further comprising:
   generating a 3D voxel grid for at least a portion of the 3D point cloud, wherein each voxel of the 3D voxel grid comprises a same set of dimensions;
   determining, for each voxel of the 3D voxel grid, whether one or more of the plurality of 3D data points is within the voxel to generate an associated set of 3D points for the voxel;
   determining, for each voxel of the 3D voxel grid with an associated set of 3D points, a single 3D data point for the voxel based on the associated set of 3D data points; and
   storing the single 3D data point in the voxel.

25. The method of 24, wherein generating the set of orientations comprises:
determining, for each voxel of the 3D voxel grid, an orientation of the single 3D data point to generate the set of orientations.

26. The method of any of 21-25, wherein generating the set of orientations comprises determining, for each 3D point in the 3D point cloud, the orientation of the 3D point based on a fixed coordinate system associated with the 3D point cloud.

27. The method of any of 21-26, wherein generating the set of orientations comprises determining, for each 3D point in the 3D point cloud, the orientation of the 3D point based on a local coordinate system associated with a 3D point of the 3D point cloud.

28. The method of any of 21-27, further comprising comparing the histogram with a second histogram associated with a second 3D point cloud to determine data indicative of a measure of similarity between the 3D point cloud and the second 3D point cloud.

29. The method of 28, wherein comparing the histogram with the second histogram comprises:
   determining a first set of peaks of the histogram and a second set of peaks of the second histogram;
   determining a correspondence between at least a portion of the first set of peaks to at least a portion of the second set of peaks.

30. A non-transitory computer-readable media comprising instructions that, when executed by one or more processors on a computing device, are operable to cause the one or more processors to generate a histogram of a three-dimensional (3D) point cloud, comprising:
receiving data indicative of a 3D point cloud comprising a plurality of 3D points;
generating a set of orientations, comprising determining, for each 3D point in the 3D point cloud, an orientation of the 3D point, wherein the orientation comprises at least a first value for a first component and a second value for a second component;
generating, based on the set of orientations, a histogram comprising a set of bins, wherein:
each bin of the set of bins is associated with a first range of values of the first component and a second range of values of the second component; and
generating the histogram comprises adding, for each bin of the set of bins, orientations from the set of orientations with first and second values that are within the first and second ranges of values, respectively, associated with the bin.

31. The non-transitory computer-readable media of 30, wherein the instructions are further operable to cause the one or more processors to perform:
   generating a 3D voxel grid for at least a portion of the 3D point cloud, wherein each voxel of the 3D voxel grid comprises a same set of dimensions;
   determining, for each voxel of the 3D voxel grid, whether one or more of the plurality of 3D data points is within the voxel to generate an associated set of 3D points for the voxel;
   determining, for each voxel of the 3D voxel grid with an associated set of 3D points, a single 3D data point for the voxel based on the associated set of 3D data points; and
   storing the single 3D data point in the voxel.

32. The non-transitory computer-readable media of 31, wherein generating the set of orientations comprises:
determining, for each voxel of the 3D voxel grid, an orientation of the single 3D data point to generate the set of orientations.

33. The non-transitory computer-readable media of any of 30-32, wherein generating the set of orientations comprises determining, for each 3D point in the 3D point cloud, the orientation of the 3D point based on a fixed coordinate system associated with the 3D point cloud.

34. The non-transitory computer-readable media of any of 30-33, wherein generating the set of orientations comprises determining, for each 3D point in the 3D point cloud, the orientation of the 3D point based on a local coordinate system associated with a 3D point of the 3D point cloud.

35. The non-transitory computer-readable media of any of 30-34, wherein the instructions are further operable to cause the one or more processors to perform:

comparing the histogram with a second histogram associated with a second 3D point cloud to determine data indicative of a measure of similarity between the 3D point cloud and the second 3D point cloud, comprising:
determining a first set of peaks of the histogram and a second set of peaks of the second histogram; and
determining a correspondence between at least a portion of the first set of peaks to at least a portion of the second set of peaks.

36. A system comprising a memory storing instructions, and at least one processor configured to execute the instructions to generate a histogram of a three-dimensional (3D) point cloud, comprising:

receiving data indicative of a 3D point cloud comprising a plurality of 3D points;
generating a set of orientations, comprising determining, for each 3D point in the 3D point cloud, an orientation of the 3D point, wherein the orientation comprises at least a first value for a first component and a second value for a second component;
generating, based on the set of orientations, a histogram comprising a set of bins, wherein:
each bin of the set of bins is associated with a first range of values of the first component and a second range of values of the second component; and
generating the histogram comprises adding, for each bin of the set of bins, orientations from the set of orientations with first and second values that are within the first and second ranges of values, respectively, associated with the bin.

37. The system of 36, wherein the instructions are further operable to cause the at least one processor to perform:
generating a 3D voxel grid for at least a portion of the 3D point cloud, wherein each voxel of the 3D voxel grid comprises a same set of dimensions;
determining, for each voxel of the 3D voxel grid, whether one or more of the plurality of 3D data points is within the voxel to generate an associated set of 3D points for the voxel;
determining, for each voxel of the 3D voxel grid with an associated set of 3D points, a single 3D data point for the voxel based on the associated set of 3D data points; and
storing the single 3D data point in the voxel.

38. The system of any of 36-37, wherein generating the set of orientations comprises determining, for each 3D point in the 3D point cloud, the orientation of the 3D point based on a fixed coordinate system associated with the 3D point cloud.

39. The system of any of 36-38, wherein generating the set of orientations comprises determining, for each 3D point in the 3D point cloud, the orientation of the 3D point based on a local coordinate system associated with a 3D point of the 3D point cloud.

40. The system of any of 36-39, wherein the instructions are further operable to cause the at least one processor to perform:
comparing the histogram with a second histogram associated with a second 3D point cloud to determine data indicative of a measure of similarity between the 3D point cloud and the second 3D point cloud, comprising:
determining a first set of peaks of the histogram and a second set of peaks of the second histogram; and
determining a correspondence between at least a portion of the first set of peaks to at least a portion of the second set of peaks.

The invention claimed is:

1. A computerized method for analyzing three-dimensional (3D) point clouds of objects, the method comprising:
receiving data indicative of a 3D point cloud of an object, the 3D point cloud of the object comprising a plurality of 3D points;
determining, based on the 3D point cloud of the object, a reference in spatial relation to the 3D point cloud of the object, the reference being within the 3D point cloud of the object;
determining, for each 3D point of the plurality of 3D points, a distance to the reference to generate a set of distances for the plurality of 3D points such that the set of distances are independent of an orientation of the object; and
generating, based on the set of distances, a histogram comprising a set of entries, comprising inserting, for each entry of the set of entries, distances from the set of distances that are within a range of distances associated with the entry.

2. The method of claim 1, further comprising:
generating a 3D voxel grid for at least a portion of the 3D point cloud of the object, wherein each voxel of the 3D voxel grid comprises a same set of dimensions;
determining, for each voxel of the 3D voxel grid, whether one or more of the plurality of 3D data points is within the voxel to generate an associated set of 3D points for the voxel;
determining, for each voxel of the 3D voxel grid with an associated set of 3D points, a single 3D data point for the voxel based on the associated set of 3D data points; and
storing the single 3D data point in the voxel.

3. The method of claim 2, wherein determining the set of distances comprises:
determining, for each voxel of the 3D voxel grid, a distance from the single 3D data point to the reference to generate the set of distances.

4. The method of claim 1, wherein:
the reference is a two-dimensional (2D) reference plane; and
determining the distance of each 3D point to generate the set of distances comprises determining a shortest distance of each 3D point to the reference plane.

5. The method of claim 1, wherein:
the reference is a reference line; and
determining the distance of each 3D point to generate the set of distances comprises determining a shortest distance of each 3D point to the reference line.

6. The method of claim 1, further comprising:
determining an estimated center of mass of the 3D point cloud of the object, wherein the reference is the estimated center of mass.

7. The method of claim 6, wherein determining the distance of each 3D point to generate the set of distances comprises determining a distance of each 3D point to the estimated center of mass.

8. The method of claim 1, further comprising comparing the histogram with a second histogram generated for a second 3D point cloud of a second object to determine a measure of similarity between the 3D point cloud of the object and the second 3D point cloud of the second object.

9. A non-transitory computer-readable media comprising instructions that, when executed by one or more processors on a computing device, are operable to cause the one or more processors to analyze three-dimensional (3D) point clouds of objects, comprising:

receiving data indicative of a 3D point cloud of an object, the 3D point cloud of the object comprising a plurality of 3D points;

determining, based on the 3D point cloud of the object, a reference in spatial relation to the 3D point cloud of the object, the reference being within the 3D point cloud of the object;

determining, for each 3D point of the plurality of 3D points, a distance to the reference to generate a set of distances for the plurality of 3D points such that the set of distances are independent of an orientation of the object; and generating, based on the set of distances, a histogram comprising a set of entries, comprising inserting, for each entry of the set of entries, distances from the set of distances that are within a range of distances associated with the entry.

10. The non-transitory computer-readable media of claim 9, wherein the instructions are further operable to cause the one or more processors to perform:

generating a 3D voxel grid for at least a portion of the 3D point cloud of the object, wherein each voxel of the 3D voxel grid comprises a same set of dimensions;

determining, for each voxel of the 3D voxel grid, whether one or more of the plurality of 3D data points is within the voxel to generate an associated set of 3D points for the voxel;

determining, for each voxel of the 3D voxel grid with an associated set of 3D points, a single 3D data point for the voxel based on the associated set of 3D data points; and storing the single 3D data point in the voxel.

11. The non-transitory computer-readable media of claim 10, wherein determining the set of distances comprises:

determining, for each voxel of the 3D voxel grid, a distance from the single 3D data point to the reference to generate the set of distances.

12. The non-transitory computer-readable media of claim 9, wherein:

the reference is a two-dimensional (2D) reference plane; and determining the distance of each 3D point to generate the set of distances comprises determining a shortest distance of each 3D point to the reference plane.

13. The non-transitory computer-readable media of claim 9, wherein:

the reference is a reference line; and determining the distance of each 3D point to generate the set of distances comprises determining a shortest distance of each 3D point to the reference line.

14. The non-transitory computer-readable media of claim 9, wherein the instructions are further operable to cause the one or more processors to perform:

determining an estimated center of mass of the 3D point cloud of the object, wherein the reference is the estimated center of mass, comprising determining a distance of each 3D point to the estimated center of mass.

15. A system comprising a memory storing instructions, and at least one processor configured to execute the instructions to analyze three-dimensional (3D) point clouds, comprising:

receiving data indicative of a 3D point cloud of an object, the 3D point cloud of the object comprising a plurality of 3D points;

determining, based on the 3D point cloud of the object, a reference in spatial relation to the 3D point cloud of the object, the reference being within the 3D point cloud of the object;

determining, for each 3D point of the plurality of 3D points, a distance to the reference to generate a set of distances for the plurality of 3D points such that the set of distances are independent of an orientation of the object; and generating, based on the set of distances, a histogram comprising a set of entries, comprising inserting, for each entry of the set of entries, distances from the set of distances that are within a range of distances associated with the entry.

16. The system of claim 15, wherein the instructions are further operable to cause the at least one processor to perform:

generating a 3D voxel grid for at least a portion of the 3D point cloud of the object, wherein each voxel of the 3D voxel grid comprises a same set of dimensions;

determining, for each voxel of the 3D voxel grid, whether one or more of the plurality of 3D data points is within the voxel to generate an associated set of 3D points for the voxel;

determining, for each voxel of the 3D voxel grid with an associated set of 3D points, a single 3D data point for the voxel based on the associated set of 3D data points; and storing the single 3D data point in the voxel.

17. The system of claim 16, wherein determining the set of distances comprises:

determining, for each voxel of the 3D voxel grid, a distance from the single 3D data point to the reference to generate the set of distances.

18. The system of claim 15, wherein:

the reference is a two-dimensional (2D) reference plane; and determining the distance of each 3D point to generate the set of distances comprises determining a shortest distance of each 3D point to the reference plane.

19. The system of claim 15, wherein:

the reference is a reference line; and determining the distance of each 3D point to generate the set of distances comprises determining a shortest distance of each 3D point to the reference line.

20. The system of claim 15, wherein the instructions are further operable to cause the at least one processor to perform:

determining an estimated center of mass of the 3D point cloud of the object, wherein the reference is the estimated center of mass, comprising determining a distance of each 3D point to the estimated center of mass.

* * * * *